(12) United States Patent
Judd

(10) Patent No.: US 11,796,623 B1
(45) Date of Patent: Oct. 24, 2023

(54) BORESIGHT METHOD WITH VARIOUS METHODS

(71) Applicant: Mano D. Judd, Heath, TX (US)

(72) Inventor: Mano D. Judd, Heath, TX (US)

(*) Notice: Subject to any disclaimer, the term of this patent is extended or adjusted under 35 U.S.C. 154(b) by 0 days.

(21) Appl. No.: 17/848,778

(22) Filed: Jun. 24, 2022

Related U.S. Application Data

(63) Continuation of application No. 15/173,025, filed on Jun. 3, 2016, now Pat. No. 10,185,022.

(51) Int. Cl.
*G01S 7/40* (2006.01)
*G01S 3/02* (2006.01)
*G01S 3/48* (2006.01)

(52) U.S. Cl.
CPC .............. *G01S 3/023* (2013.01); *G01S 3/48* (2013.01)

(58) Field of Classification Search
None
See application file for complete search history.

(56) References Cited

U.S. PATENT DOCUMENTS

| 8,184,042 B2* | 5/2012 | Ray | H01Q 3/267 342/174 |
|---|---|---|---|
| 10,680,725 B1* | 6/2020 | Lu | H04B 17/12 |
| 2008/0130800 A1* | 6/2008 | Maxim | H03C 3/40 375/345 |
| 2017/0310004 A1* | 10/2017 | Swirhun | H01Q 3/36 |
| 2021/0050667 A1* | 2/2021 | Ray | H04B 7/0617 |

\* cited by examiner

*Primary Examiner* — Sunit Pandya

(57) ABSTRACT

The present invention, Methods for RF or Acoustic Boresighting, is a collection of various methods of accounting for and correcting for the errors that occur in a receiver during signal collection, and are an extension of patent Ser. No. 10/185,022, by using Radio Frequency coupling as opposed to switches. These updated methods enable a means to ensure a collected signal can be calibrated at any point during the signal collection period without having to cease signal collection in order to switch in a reference signal. These methods also account for signal bandwidth and signal type, including wideband, pulse, and continuous signals.

16 Claims, 23 Drawing Sheets

- RF Synthesizer path produces the boresighting signal

BORESIGHT METHOD WITH VARIOUS METHODS

TECHNICAL FIELD

The present invention is in the technical field of RF receivers and Direction Finding or Radar Methodologies and/or RF Calibration and Boresighting. More specifically, the present invention is a novel way of assuring high bearing angle accuracy, for Directional of Arrival (DoA) applications, such as Direction Finding or Radar, during RF signal collection by using a continuously injected calibration signal (also called a reference signal) into the receiver to correct for phase and amplitude errors or signal perturbations.

BACKGROUND OF THE INVENTION

During the signal collection process used in Direction Finding (DF), Digital Radar of other Spatial Processing applications, signals are processed by multichannel receivers which take the collected signals and coherently frequency shift them down in frequency to an Intermediate Frequency (IF) or to baseband, so they can be digitized and processed at a lower frequency that is adequate for high speed Analog to Digital Converters (ADCs). In order to perform the Spatial Processing operation, the cross product of multiple receiver channels is taken to obtain the cross phase between each two antenna components or antenna pairs.

Historically, for most Bearing Angle estimation processes, such as Direction Finding or Radar, the DoA accuracy is often compromised when using most multi-channel receivers since the frequency shift operation results in phase and/or amplitude distortions of each signal, that add to perturb the true cross product of the antennas, and therefore perturb the effective cross phase. This distortion is often caused by temperature, time, and vibration instability of the various RF and IF components in the receivers, as well as any and all multiplicative processes which include high frequency signal mixing. All of these events can therefore add either multiplicative products, such as colored noise, phase noise, or other non-linear components into the cross phase outputs.

Conventional DF systems use switched calibration (or boresighting) to attempt to compensate for these non-stationary, time invariant effects.

The conventional solution to the accuracy problem in Direction Finding is to use a switched calibration (or boresight) method. This process involves occasionally injecting a calibration (or boresight) signal into the path between the antennas and the multichannel receiver. However, this method has serious shortcomings. In the switched method, the antennas are momentarily switched out, when the calibration boresight source is switched in, usually only once per day or per flight. It has been discovered that the time invariance of these detrimental effects occurs at a much faster rate and shorter time scales than simply once per day or per month. In fact, these non-linear time variant perturbations seem to occur, as discovered by rigorous lab and flight testing, on a millisecond or microsecond time scale. Thus, RF calibration corrections that only boresight once per day or even per hour, are insufficient to reduce these non-linear time variant errors, to produce bearing angle accuracies better than roughly 1 degree (spatial).

BRIEF SUMMARY OF THE INVENTION

The present invention is a Method for RF or Acoustic Boresighting.

The present invention is a collection of various methods of accounting for and correcting for the errors that occur in a receiver during signal collection. These methods are an extension of patent Ser. No. 10/185,022. Errors occur in a receiver during signal collection due to changes in temperature, a receiver's age, vibration of the system during collection, oscillator lock, and non-linear multiplication of signals, such as the signal mixing or RF down conversion process. In many conventional boresighting (calibration) methods, a wideband noise source is generally used so that RF tuning is not necessary. However, some methods utilize a narrowband boresight source. Regardless of the source type used, this source is then split, M ways, and switched input to each receiver (input) channel. This updated method, first presented in patent Ser. No. 10/185,022, enables a means to ensure a collected signal can be calibrated at any point during the signal collection period without having to cease signal collection in order to switch in a reference signal.

One of the key elements of this method first presented in patent Ser. No. 10/185,022, is that instead of switching between the two input paths: the desired external (Far Field or Near Field) signal or the boresight source, both of these signals are RF coupled together, thus both signals can simultaneously be routed to the receiver on the same RF transmission line(s). The calibration/boresight signal can be (frequency) offset from the desired external (Far Field or Near Field) signal, or it can be code division multiplexed on top of the desired (external) signal; with a follower decoding circuit to remove it after receiver down-conversion, in frequency.

The current invention expands on the initial Patent, first presented in patent Ser. No. 10/185,022, to include multiple other modes or architectures, in which a coupled RF boresighting signal or collection of boresight signals, can be implemented, to achieve narrowband boresighting, pulse signal boresighting, or extremely wideband signal RF boresighting.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Conventional Array Response Model

Figure 1:
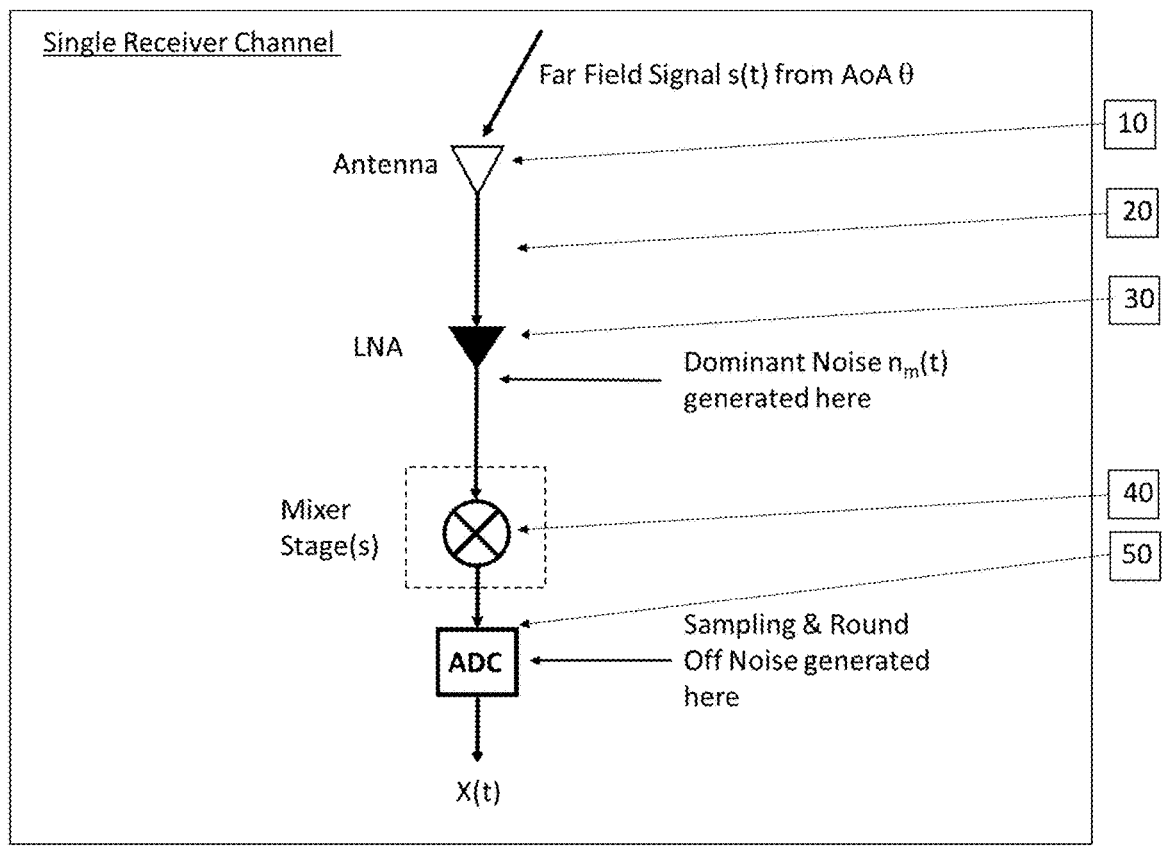
FIG. 1 shows the standard representation for the output of a single (RF or Acoustic) receiver system.

In an RF (or acoustic) sensor, a receive sensor converts the received wavefield into an electrical signal. For the case of RF, the incident wavefield is comprised of photons. For Acoustics, the wavefield will either be air, water, or some other gas or liquid (molecules). For the sake of simplicity, the remainder of this patent will restrict text and descriptions to RF wavefields and RF systems, although all concepts have a direct similarity in acoustics systems (gaseous or liquid medium of transport of the wave field). In FIG. 1, the Applicant shows a conventional single channel (single antenna) receive system comprised of an antenna (10), a transmission line such as a coaxial cable (20), a Low Noise Amplifier (30), an RF Mixer (circuit) to downconvert or frequency shift the carrier signal to an Intermediate frequency (IF) or to baseband (40), and finally an Analog to Digital Converter (50).

The standard representation for the output of a single (RF or Acoustic) receiver system, which is shown in FIG. 1, is:

$$x(t)=s(t)+n(t)$$

where:
x(t)=time variant output signal
s(t)=time variant input signal
n(t)=time variant additive noise Note at this stage, we are not specifying any particular signal type, signal bandwidth, or noise type or distribution.

In a Multi-Channel Receiver (MCR) system, following an antenna array system, we would denote an output vector for the collection of synchronized signals as:

$$\underline{x}(t)=\underline{a}(\theta)s(t)+\underline{n}(t)$$

where
x(t)=time variant output signal vector for m=1, 2, ..., M RF Channels
a(θ)=array steering vector, for M channels (dimension M×1)
s(t)=time variant input signal, which is assumed exactly the same for each channel
n(t)=time variant additive noise vector (dimension M×1)

The array steering vector includes both the time-path length from each antenna to the Far Field (desired) source signal, but also included all $m_{th}$ path unique lengths through the various transistor and mixer circuits within the receiver.

Figure 2:
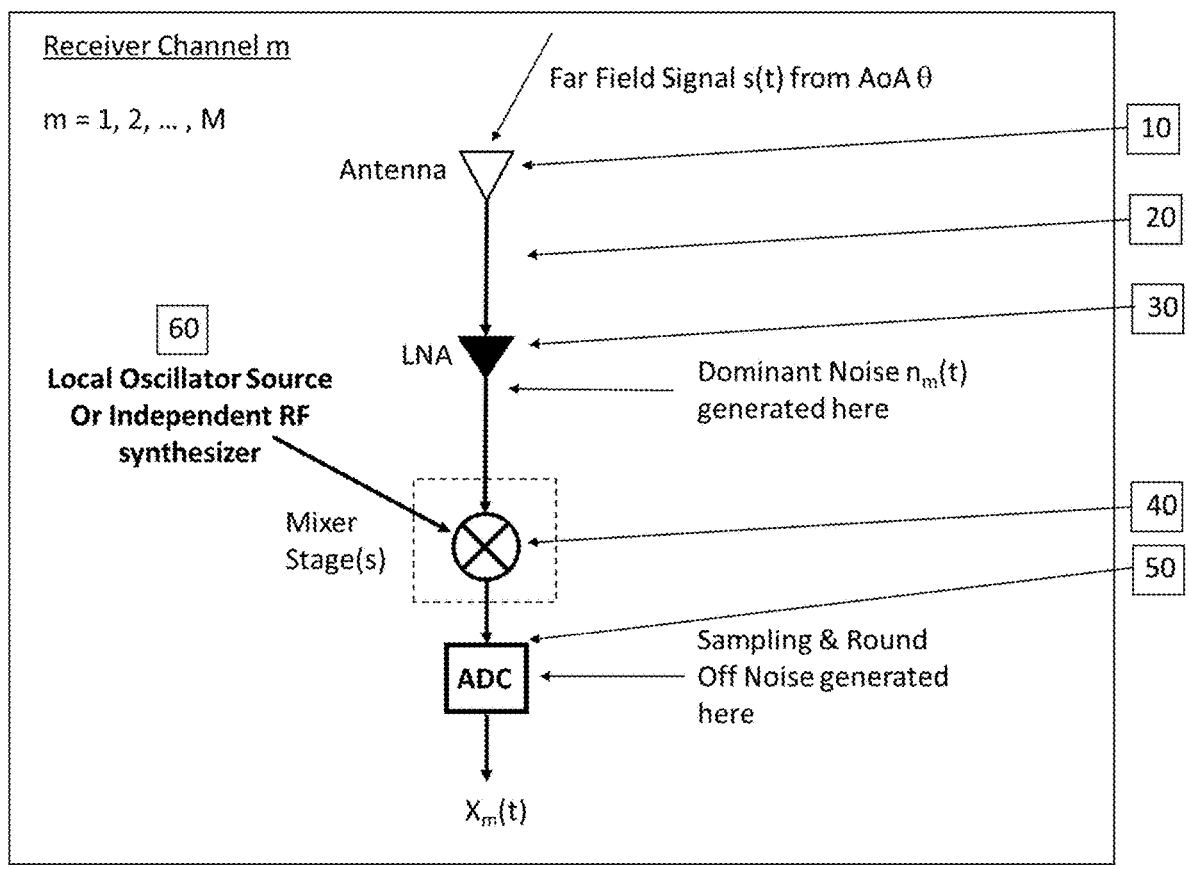
FIG. 2 displays the RF Schematic for a single channel of a Multi-Channel Receiver.

This is the traditional representation for the array signal output, from a conventional MCR. A single receiver channel is shown in FIG. 2. Notice that all components are similar to the Single Channel system of FIG. 1, except for the [Common] Local Oscillator (LO) Source (60). In more current receivers, this LO source can be an independent RF Synthesizer, which is time synchronized and phase locked to the other M−1 RF Synthesizers for the other channels (m=1, 2, ..., M).

It should be noted that both the Analog channels as well as the Analog-to-Digital Converter (ADC) units are all also synchronized in time and coherent. At this point, we are not denoting which type of synchronization/coherency method is used, such as a Split-LO system or a system of individual synthesizers at each channel. That is, in general, the method will operate with any means to supply an antenna channel with a common RF signal used as a boresighting source.

Conventional Wisdom, including many thousands of published papers, suggests the following:
1. The dominant system noise in the system, for a receiver noise limited system (e.g. above roughly 100 MHz), is produced at the 1st stage LNA,
2. This noise is purely Gaussian Wide Sense Stationary
3. All other noise contributions are small (in magnitude) compared to this (LNA generated) noise, including round-off noise (error)
4. The receiver transfer function itself is Wide Sense Stationary.

For the defined array response vector, $x_m(t)$, shown above, the narrowband AutoCorrelation function for an equal spaced linear array, $R_{xx}(\tau)$, can be defined as:

$$R_{xx}(\tau)=E[\underline{x}(t)\underline{x}^*(t)]$$

Where E is the Expectation operator, * is the complex conjugate, and $$\tau = \frac{d\sin(\theta)}{c}$$

Is the delay (lag) value for each non-diagonal component of $R_{xx}(\tau)$.

And
d=inter element spacing, for the equal spaced linear array
c=speed of light
θ=Angle of Arrival (AoA) of the incident Far Field signal The Sampled Autocorrelation can then be defined, for a collection of N samples of the array response vector, $\underline{x}(t)$, as:

$$R_{xx}(\tau) \approx \frac{1}{N}\sum_{n=1}^{N}\underline{x}(n)\underline{x}^*(n)$$

The Autocorrelation function thus defined so far is only a function of the inter-element spacing, frequency of the incident signal, and the Angle of Arrival. Note that a random process X(t) is said to be wide Sense Stationary (WSS) if its mean and autocorrelation function are time invariant. For a fixed location (and orientation) system and a fixed location external (Far Field or Near Field) source, the Array Response Autocorrelation function is assumed and expected to be time invariant, and would then be considered Wide Sense Stationary. That is, if one measured the Autocorrelation function in the month of January, and did not move and/or reposition the receive array nor the external (Far Field or Near Field) source, one would then expect to measure the exact same Autocorrelation function in June. By this definition, it should then be obvious that the Autocorrelation function for a receiver system would be time invariant, and thus WSS. It should be noted that this assumption is the basis for most all array processing based research papers, as well as actual performance estimates for nearly all Direction Finding as well as Radar systems through-out history. For the remainder of this document, we will denote the external source as the "Far Field" source, and omit the wording of "Near Field", however, it should be obvious to one skilled in the art that the following methods would apply to both Far Field as well as Near Field external RF sources.

Thus the pursuit for improved bearing angle accuracy has always been to find methods that are outside of the box of the array receiving system, including:
1. Larger array size (dimensions) and/or greater number of receiver channels.
2. Improved spatial processing algorithms, such as MUSIC, MVDR, etc. . . . .

In general, the pursuit of ever better DF/Bearing Angle accuracies has been mostly limited to attempts to increase the size of the array baseline (distance between the outermost antennas), or to utilize ever better algorithms and software. In fact, it is highly believed by most experts in the field that the solution to better performance is algorithm centric; and never "system" centric. However, in the 1990's, it was found that although algorithms like MUSIC had numerous performance advantages, especially in the ability to handle numerous Co-Channel signals, that most algorithms actually had very similar bearing angle performance; at least to a single (non-co-channel) Far Field signal. In fact, MUSIC and MVDR have been compared via multiple technical research studies and papers and found to have very similar bearing angle performance, as a function of similar array size and Signal to Noise Ratio (SNR) values. Thus, for many years, prior to 2010, it was believed by most experts in the field that the only means to achieve better bearing angle was to utilize a larger baseline array. Additionally, no real effort has ever been recorded to verify the amount of stationarity (time invariance) of most receivers. This was until the Applicant's discovery in late 2010.

Conventional System Calibration for Higher Performance Systems:

Historical belief has been that the Receiver Autocorrelation Function (RAF) is mostly WSS; e.g. over long periods of time. For many ground based DF systems, it has been assumed that the system is WSS over months or years. And to no surprise, many of these systems only achieve bearing angle performance at best to 5° to 20° (spatial) accuracy (error).

Figure 3:
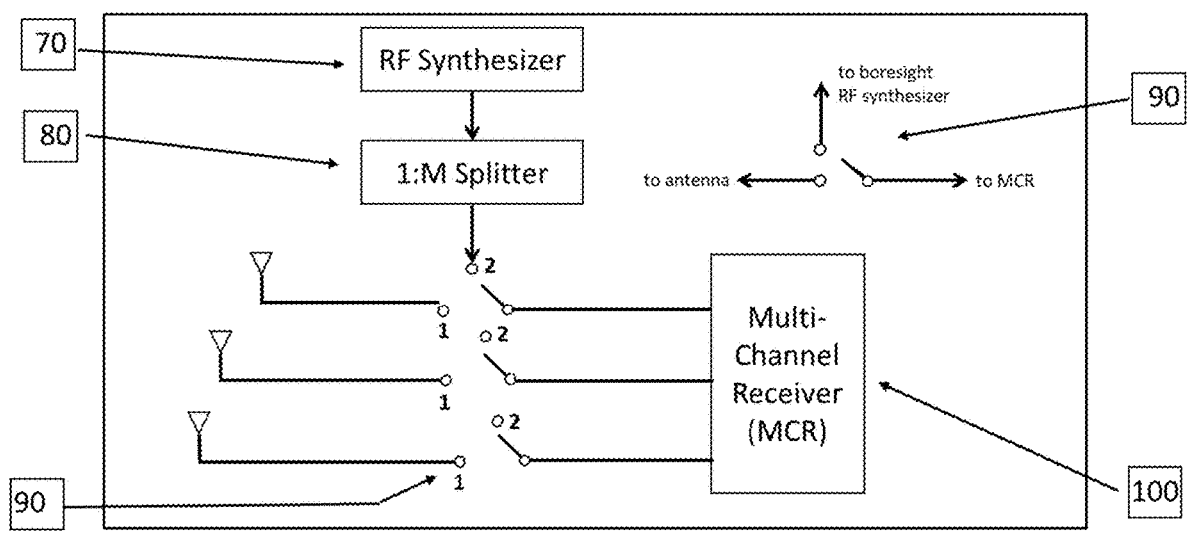
FIG. 3 illustrates the Conventional Boresighting Method using RF Switches.

Designers of higher performance systems have typically assumed that extremes in temperature, via expanding cables and heated Receiver components could slightly alter the RAF, but that within day long or hour long time frames, the RAF was very WSS. These systems would perform an additional calibration correction, denoted as "RF Boresighting" once per day or once per flight, to attempt to correct the stored array manifold (e.g. calibration steering vectors, across azimuth and frequency, and sometimes elevation) for non-stationarity (e.g. time invariances) in long length cables, large temperature variations, or aging of components. This led to the use of Switched in Calibration techniques, as shown in FIG. 3. Single Pull Double Throw RF switches have typically been used.

Again, for higher precision Direction Finding (DF) systems, this (switching to the boresight source, and generating a boresight data vector) was typically performed once a day, after the DF or Radar unit was turned on and warmed up, or for aircraft, right before or after take-off.

After the DF system was integrated on to the platform, the system was flown and steering vectors were produced for each stepwise increment in azimuth, frequency, and sometimes for elevation. For many years, most legacy ISR aircraft only produced Cal (an Array Manifold) in frequency and azimuth only, and not in elevation. In general, very few systems for airborne or ground use, spent the additional calibration or flight time and cost generating Cal in elevation.

In general, the Far Field Calibration Vectors were represented as:

$\underline{a}(\theta, \phi, f, t_{cal})$

Along with this far field calibration, the system would be "boresighted" using the internal source or RF synthesizer switched in to the MCR. This would be performed also at each frequency, and then the computer would generate an independent set of boresight calibration vectors:

$\underline{b}(f, t_{cal})$ for each and every array steering vector: $\underline{a}(\theta, \phi, f, t_{cal})$.

Note that the Far Field Calibration vectors are a function of the Azimuth Angle of Arrival, $\theta$, the Elevation Angle of Arrival, $\phi$, the specific carrier frequency, f, and of course the relative time that this calibration was taken, $t_{cal}$, while the boresight calibration vectors are a function of frequency only. For multi-polarization systems, the signal polarization component (vector) could also be included, however, these will not be addressed in this application. Note, for the switched method, the boresight source was set to the same frequency as the Far Field signal, and the boresight collection (dwell interval) was usually only microseconds or milliseconds away in time from the Far Field data collection dwell. Thus, for most practical purposes, the Far Field collection time interval $t_{cal}$ was "assumed" to be equivalent with the boresight data collection interval $t_{cal}$ in actuality, these were actually at significant different times. That is, up to minutes or even hours apart. This will be discussed later.

Calibration data was often taken at step values of both the azimuth and elevation angles, as well as in frequency, depending on how much flight time was allotted to calibration data collection. That is, significant and expensive flight time has been associated with the collection of dense Cal data, especially when multiple elevation points are desired. However, for the most part, many systems only calibrate at a single elevation angle. Autocorrelation functions were usually airborne computed, stored, and then processed on the ground to generate the calibration tables (array steering vectors). Later, in operation, these vectors would be interpolated over both space and frequency, upon demand.

In operation, usually right after take-off, the system would (again) be boresighted. Just after take-off, the MCR system would often be boresighted, just once (at each frequency), to obtain a single bore vector for each frequency, of:

$\underline{b}(f, t_{opto})$

Where tow is the time from of the operational-time just after take-off, or "opto".

Then during (operational) flight, when a signal was detected from the [SIGINT] signal intercept system and determined to be a signal of interest, the intercept system would hand off the frequency to the RF Geolocation System, to extract a bearing angle or Direction of Arrival (DoA). The set of Array Manifold vectors, $\underline{a}(\theta, \phi, f, t_{cal})$, would then be boresight corrected via the following transform:

$$a'_m(\theta, \phi, f, t_{cal}) = a_m(\theta, \phi, f, t_{cal})\frac{b_m(f, t_{opto})}{b_m(f, t_{cal})}$$

for $m = 1, 2, \ldots, M$

Where the prime represents the modified calibration vector.

There are a number of characteristics and limitations particular with this approach:

1. While the switches are in the boresight position (e.g. directed to the boresight source or synthesizer), Far Field signal data cannot be collected. Thus, one could not boresight at the same time as collection of a signal.

2. The time interval between the RF dwells for the boresighting process, and the operational collection of the data steering vectors, could be many hours in time separation.

3. For more highly sophisticated systems, where the boresighting was implemented in more real time, the boresight vector, $\underline{b}$, and the Far Field signal data vector, $\underline{x}(t)$, can still only be measured at different times, although usually within an interval less than a few seconds.

4. Depending on the resolution of the boresight synthesizer, it was desired to choose the boresight frequency as close to the desired Far Field (intercepted) frequency.

5. Since many frequencies would be boresighted, and stored along with the calibration vectors an their boresight at time $t_{cal}$ it was assumed that the from the time of take-off and boresighting, $t_{opto}$, to the time of a Direction Finding (DF) measurement, that receiver system was still Wide Sense Stationary. That is, that the system was usually WSS for a time period of at least a full day or a full flight.

The success of this approach has been to achieve roughly 5° of DF system accuracy for low cost system, or systems with array size on the order of 10 wavelengths or less. The very best airborne system could achieve DF accuracies, for most COMINT signals, on the order of 1°, at best. The belief was always that these systems were aperture limited. That is, the dominant error source in the DF estimate was due to limited aperture size of the array.

The actual architecture operation of a typical receiver is shown in FIG. 2, where the chain depicts a single channel (m) of a multi-channel receiver of M elements. This figure shows a single stage conversion, however, is general to include multi-stage downconverters as well (such as the Super-Het).

There are a number of non-linear processes that occur at the mixer stage of a receiver, since frequency shifting is in fact a trigonometric transform of sines and cosines (nonlinear functions). In fact, while phase noise and other artifacts are known to exist, there is actually very little published data on the measure, separation, and statistical effects of all the various components of "junk" (spurs, IMD, intermods, . . . ) produced within the mixer stage(s), in addition to ADC truncation noise. Additionally, to truly understand these processes, each would need to be separated from one another to measure and understand the Probability Distribution Function (PDF) of each independent process, and to determine the actual PDF function for each event and mechanism. In conventional Spatial Processing, these processes are simplistically treated as linear processes, and with effects that do not change or affect the PDF of the LNA generated noise, thus again estimating the output noise, $\underline{n}(t)$, as simply Gaussian WSS.

Through many measurements of the transfer function, the Applicant has determined that the output noise and thus the RAF are not truly WSS; at least to the accuracy level that would enable fantastic bearing angle errors. Furthermore, it is often assumed that any additive noise in the system, beyond the initial Low Noise Amplifier (LNA) KTB noise would both be well below the LNA noise, in amplitude, and further would also simply be additive and Gaussian.

Figure 4:
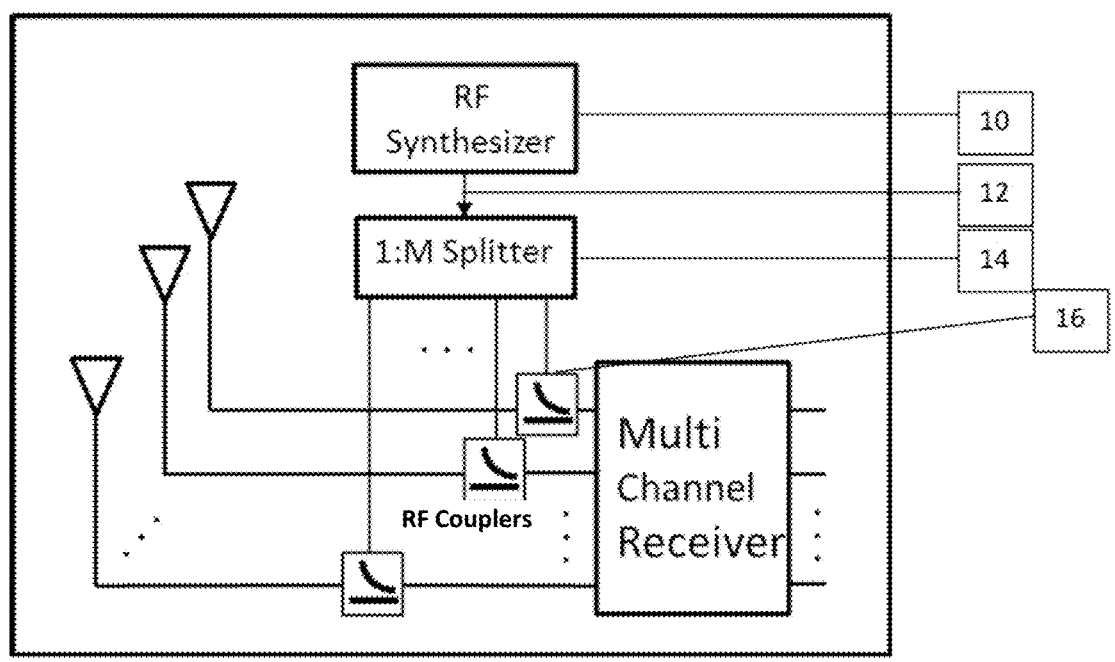
FIG. 4 shows the prior art for the coupled receiver boresighting system.

In 2009, the Applicant and DRS (formerly Watkins Johnson Inc.) developed the Lancelot Receiver system. For reasons that the Applicant will not go into for this application, switching between the desired Far Field signal and the intermittent boresight signal, wasn't possible. Thus, the decision was made to use directional RF couplers, as opposed to SPDT RF switches, as shown in FIG. 4, which is prior art in patent Ser. No. 10/185,022.

Figure 5:
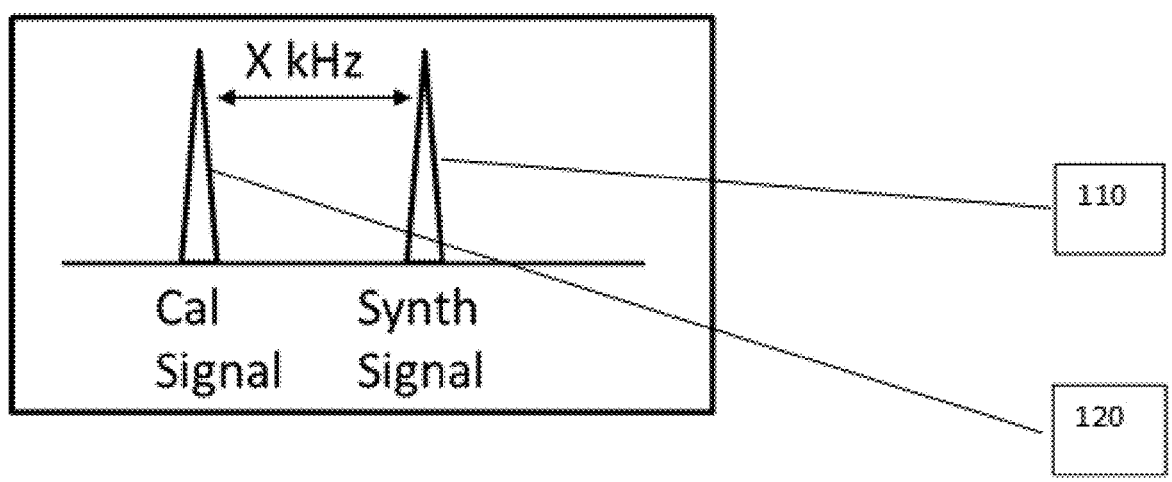
FIG. 5 illustrates the signal offset technique for boresighting.

At calibration, each RF ADC channel then output the following two signals: the synthesized boresight signal (110) and the desired Far Field Calibration Signal (120), as shown by the Spectral Diagram, in FIG. 5.

Figure 6:
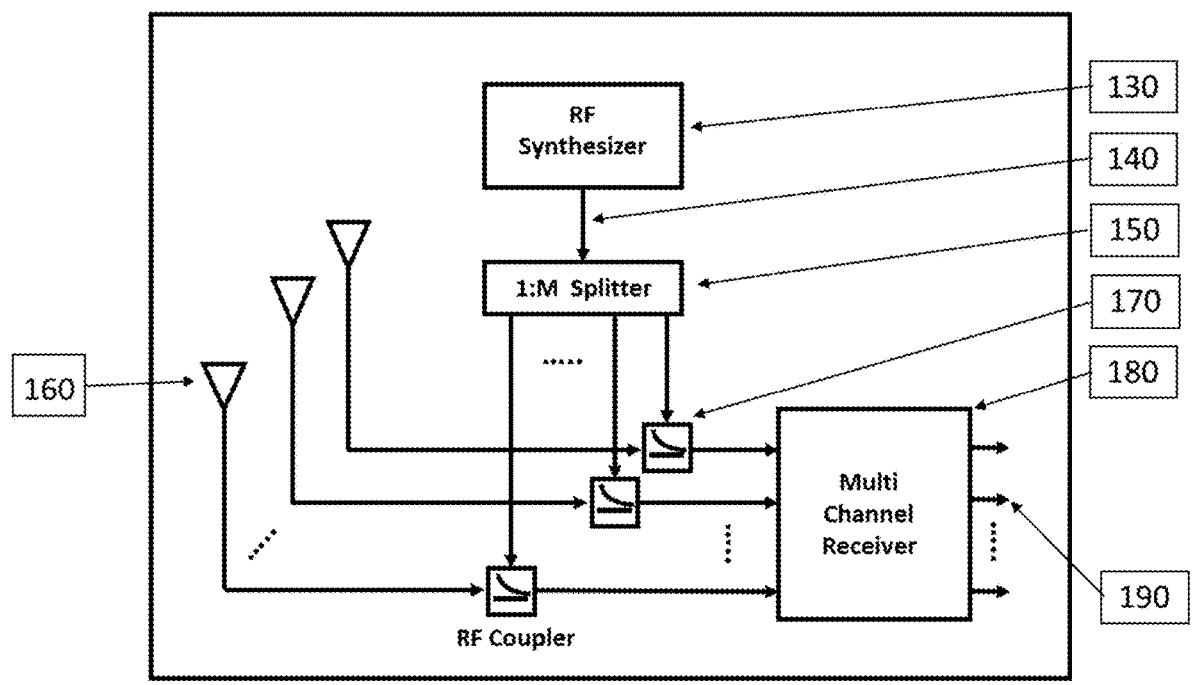
FIG. 6 and FIG. 7 show the Applicant's Original Boresight System from U.S. patent Ser. No. 10/185,022.

This system can be more specifically described by FIG. 6.

Outputs from each Multi-Channel receiver channel are labeled as (190). These outputs will be ADC digital outputs, however can also be simply analog RF or IF outputs as well.

This system now deviated from the Conventional Calibration and boresighting process in that:

1. Directional Couplers as opposed to SPDT RF switches are used.
2. During system calibration, each Far Field calibration vector, $\underline{a}(\theta)$, can be collected at exactly the same time as the associated boresight vector, $\underline{b}$.
3. During operation, the Far Field data signal vector, $\underline{x}(t)$, can be collected at exactly the same time as the associated boresight vector, $\underline{b}$.
4. The boresight signal, for narrowband Far Field signals s(t), will not be on the exact same frequency. However, there are methods to place these two frequencies very close together.
5. Boresighting can be performed in real time, and not only after take-off.

In 2010, The Applicant flew this DF Collection system which used the above architecture. The result of this process produced extremely high quality calibration vectors, as well as very low error DF bearing angle estimates.

The Applicant has developed an augmented model for the output response of the Multi-Channel Receiver (MCR) system, following an antenna array system, as:

$$\underline{x}(t) = \text{diag}[\underline{\gamma}(t)] \cdot [\overline{a}(\theta)s(t) + \underline{n}(t)] + \overline{\alpha}(t)$$

Where, again $\underline{x}(t)$ = time variant output signal vector for m=1, 2, . . . , M RF (Antenna) Channels $\underline{a}(\theta)$ = array steering vector, for M channels (dimension M×1)

s(t) = time variant input signal, which is assumed exactly the same for each channel $\underline{n}(t)$ = time variant additive noise vector (dimension M×1) and $\gamma(t)$ = the multiplicative noise component of receiver mixer effects $\alpha(t)$ = the additive noise component of the receiver mixer effects diag = diagonal matrix operator, with zeros as non-diagonal components Note, that both γ(t) as well as α(t) can include all the combined, interactive, and non-linear effects attributed to all components and paths of the receiver mixer, but can also including digital round-off effects within the ADC. Further, we treat both the amplitude, phase, as well as PDF values of both γ(t) and α(t) as both unknown as well as time-variant. Finally, we place no knowledge on the amount of time variance or invariance within any time interval, or time of day. However, we have found through testing that time stationarity (invariance) improved with shorter and shorter time intervals.

This model actually makes good sense, since we know that phase noise is actually a multiplication of the input signal by a complex phase, or:

$$x'_m = e^{\varphi(t)} \cdot [\underline{a}(\theta)s(t) + \underline{n}(t)]$$

Where $\varphi(t)$ is the random phase angle of the phase noise. A worst case assumption is that:

$$\gamma(t_i) \cdot \gamma(t_{i+1})$$

for even very small time increments (on the order of microseconds).

Or that the value of the multiplicative noise component is time variant (e.g. different) from sample to sample. Rewriting this term:

$$\bar{x}(t) = \text{diag}[\underline{\gamma}(t)] \cdot [\underline{a}(\theta)s(t) + \bar{n}(t)] + \underline{\alpha}(t) = \text{diag}[\underline{\gamma}(t)] \cdot \underline{a}(\theta)s(t) + \text{diag}[\underline{\gamma}(t)] \cdot \underline{n}(t) + \underline{\alpha}(t)$$

This has profound issues with respect to signal integration and assumed processing gain.

One fundamental assumption in most processes that claim to achieve processing gain is that the noise is Gaussian WSS. With Gaussian WSS noise, the noise is assumed zero mean (by definition). However, analyzing the new noise mean would be:

$$\text{New mean} = E[\text{diag}[\underline{\gamma}(t)] \cdot \underline{n}(t)]$$

The detailed statistical mathematics will be avoided here, however, it should be obvious that the multiplication of an assumed Gaussian Random variable with a component of unknown PDF and mean is unlikely (or at least not guaranteed) to be absolutely Gaussian. Especially since the artifacts of the Mixer circuit are not thermal noise based, but mostly non-linear multiplications.

Additionally, the additive α(t) term is assumed equally unknown, with unknown PDF, mean, and stationarity.

Figure 7:
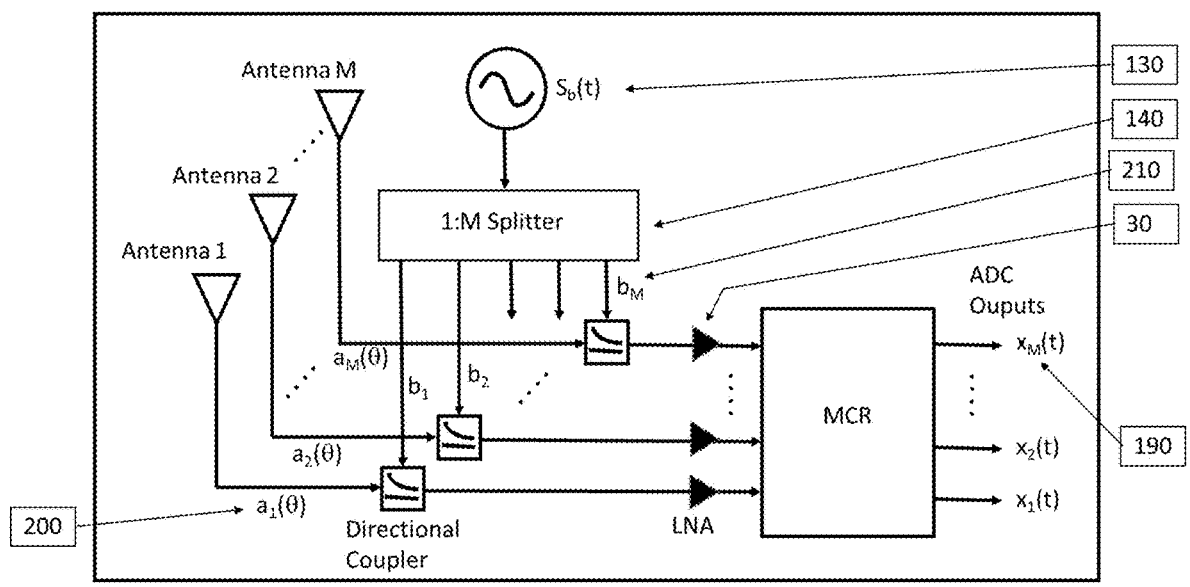

For either switched or coupled architecture, it should be pointed out that the Boresight (source) signal, $s_b(t)$, that is coupling into each $m^{th}$ channel takes the exact same path, through all filter and mixing products, due to its spectral vicinity to the desired Far Field Signal. This signal can be initially modeled, as $b_m s_b(t)$, where $b_m$ is simply the circuit length or circuit time delay from the boresight source to the coupler (m=1, 2, ..., M). In fact each $b_m$ path is simply the complex delay including the transmission line length from the source to the 1:M RF splitter, the splitter path delay (usually made from Wilkinsons binary splitters), the transmission line length from the splitter to the $m^{th}$ coupler, and finally any path length additive of the $m^{th}$ coupler, as shown in FIG. 7. The Far Field paths (200), which include both the path from an antenna to the Far Field source plus the antenna path length and the transmission line path length to the channel directional coupler (170) is denoted as $a_m(\theta)$, m=1, 2, ..., M. These values are a function of the Far Field Angle of Arrival, θ.

The $b_m$ values (210) are path lengths from the common boresight source (130) to each channel directional coupler (170). They are independent of the Far Field Angle of Arrival.

For optimal implementation, It should also be mentioned that it is critical that the RF couplers precede any active component, such as the initial LNAs, as shown in FIG. 7. That is, even LNAs can add non-Gaussian or time variant artifacts into the signal path.

Thus the total signal input to each receiver port will now be:

$$a_m(\theta)s(t) + b_m s_b(t) + n_m(t)$$

And the vector response out from the ADC $$\underline{x}(t) = \text{diag}[\underline{\gamma}(t)] \cdot [\underline{a}(\theta)s(t) + \underline{b}s_b(t) + \underline{n}(t)] + \underline{\alpha}(t) = \text{diag}[\underline{\gamma}(t)] \cdot \underline{a}(\theta)s(t) + \text{diag}[\underline{\gamma}(t)] \cdot \underline{b}s_b + \text{diag}[\underline{\gamma}(t)] \cdot \underline{n}(t) + \underline{\alpha}(t)$$

Figure 8:
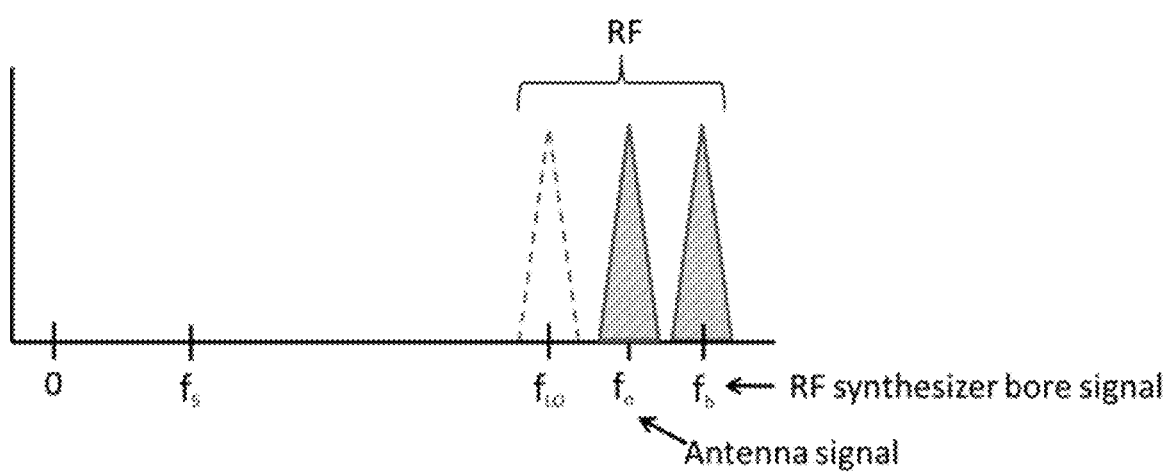
FIG. 8 shows a carrier frequency model for the far field (antenna) signal and Boresight Signal.

For each channel, at the carrier frequency spectral region, the signals will be spectrally located in the following fashion (narrowband model), shown in FIG. 8. The Far Field Signal, received from an antenna, is centered at frequency $f_o$, and the narrowband boresight tone is centered at frequency $f_b$. The Multi-Channel Receiver (MCR) Local Oscillator tone, used to downconvert both signals, is centered at frequency $f_{LO}$. Without loss of generality, this LO tone frequency could be positioned in other spectral locations.

Figure 9:
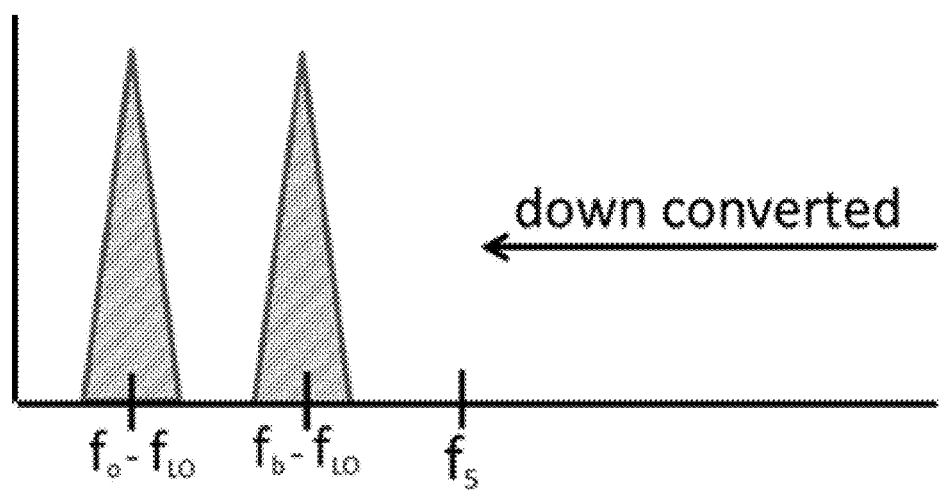
FIG. 9 shows a baseband representation of the two downconverted signals.

After coherent downconversion, the signals will be similarly arranged, in baseband, as seen in FIG. 9. Notice that the new signal frequencies will be all frequency shifted values from their original carrier frequencies, and thus with frequencies much less than their original carrier values.

After downconversion to baseband, prior to digital sampling, the two signal's spectral locations are shown in FIG. 9, where $f_s$ is the MCR ADC sample rate. For real valued signals, both downconverted signals will be positioned to a spectral location less than half of the sample rate. Note this process includes Low Pass Filtering to remove any image signals, prior to digitization. This representation will be similar for all M channels, again where M is the number of antennas as well as the number of independent receiver channels.

For the Narrowband case, it should be noted that both signals also have the very similar noise content. That is, as long as $f_s$ is much larger than twice the highest frequency of either signal, and for two signals that are spectrally closely spaced, the noise content on any single digital sample should be similar for each signal. We now band pass filter each separate signal, via a Digital DownConverter (DDC), and from the original combined signal output from the ADC:

$$\underline{x}(t) = \text{diag}[\underline{\gamma}(t)] \cdot \underline{a}(\theta)s(t) + \text{diag}[\underline{\gamma}(t)]\underline{b}s_b(t) + \text{diag}[\underline{\gamma}(t)] \cdot \underline{n}(t) + \underline{\alpha}(t)$$

That is, a copy of (20) is generated and fed to two different processing paths.

Figure 10:
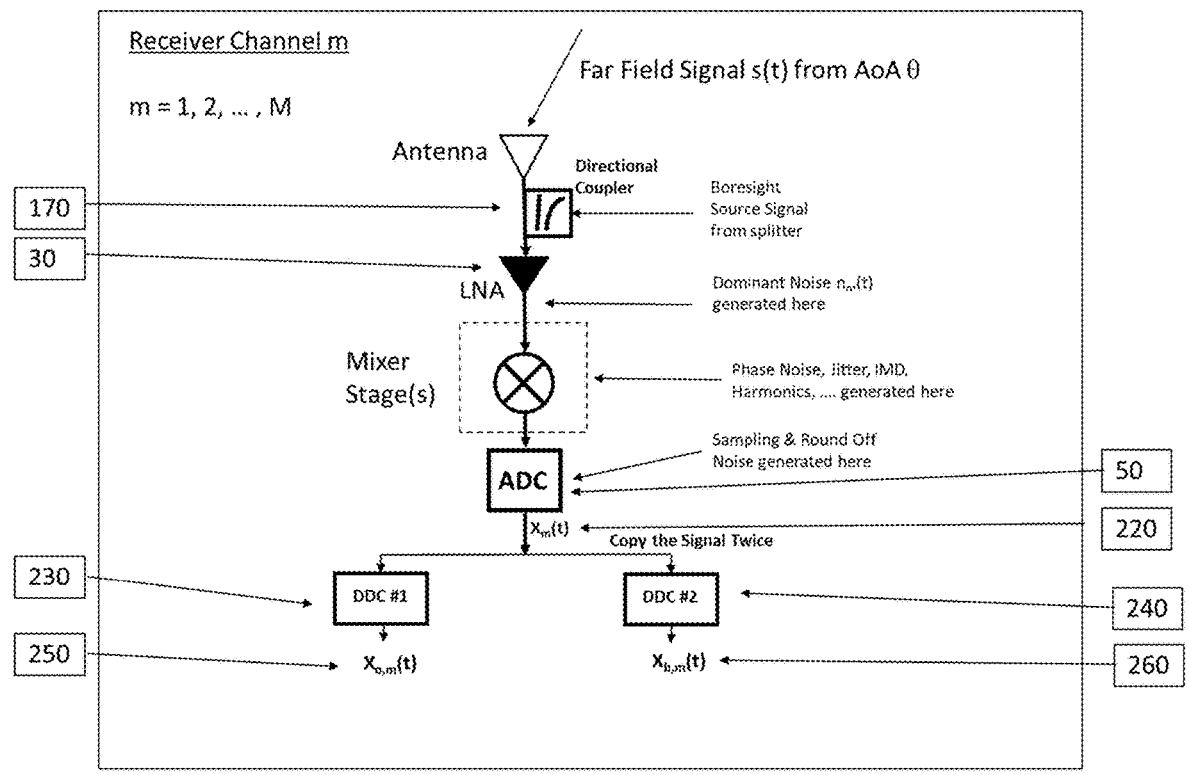
FIG. 10 shows the hardware implementation for the boresight process, for each m channel.

The hardware implementation for this approach (narrowband model shown), is seen in FIG. 10.

Instead of a single output (220) from each ADC, we now have two synchronous signals that are identical copies of each other and the signal at (220), yet each is processed with an independent path.

Note that RF circuitry, e.g. the RF Coupler (170), has been added prior to the LNA (30), or any active circuitry or long cables, and there are now two independent DDC channels, (230) and (240), after the ADC. Note, both DDCs, (230) and (240), can be implemented via FPGAs, or any other high speed processing mechanism, thus if the current (MRC) receiver FPGA has adequate computing power, then little or no Digital Hardware changes would be required at the back end. For Dual Polarization operation, one would implement three (3) DDC's per Channel. Two DDCs for each Far Field Signal polarization, and the third DDC for the boresight signal.

One path band pass filters the Far Field signal from the antenna, using DDC #1 (230), and the other path band pass filters the boresight signal, using DDC #2 (240). It is important that both filters have exactly the same number of taps (e.g. filter length), such that the two signals are still temporally synchronized. However, since each signal's spectral location will be slightly different, the filter [tap] coefficients will of course be different.

The first resultant signal (250) is the bandpass filtered Far Field Signal, with noise:

$$\underline{x}_o(t) = \text{diag}[\underline{\gamma}(t)] \cdot \underline{a}(\theta) s(t) + \text{diag}[\underline{\gamma}(t)] \cdot \underline{n}(t) + \underline{\alpha}(t)$$

And the second resultant signal (260) is the bandpass filtered Boresight Signal, with noise:

$$\underline{x}_b(t) = \text{diag}[\underline{\gamma}(t)] \cdot \underline{b} s_b(t) + \text{diag}[\underline{\gamma}(t)] \cdot \underline{n}(t) + \underline{\alpha}(t)$$

Note that we will have two such signals, (250) and (260), for each m channel (m=1, 2, . . . , M).

What is very important here is that when the Far Field signal frequency and the boresight frequency are very close in spectral proximity, their time variant noise is almost completely identical. That is, on a sample by sample basis, their noise values are the same. Taking this to the limit (in time), thus not only are the noise values the same, but any non-linear or non-Gaussian [PDF] event that occurs on one signal, will also occur on the other. Therefore, the γ(t) multiplicative value will be the same, or at least mostly similar, on the two signals.

If we now dot-divide each $m^{th}$ channel band pass filtered Far Field signal by the synchronous and band pass filtered $m^{th}$ channel boresight source signal, from the two processing paths, we get:

$$x_{ob,m} = \frac{\gamma_m(t) \cdot a_m(\theta) s(t) + \gamma_m(t) n_m(t) + \alpha_m(t)}{\gamma_m(t) \cdot b_m s_b(t) + \gamma_m(t) n_m(t) + \alpha_m(t)}$$

This is actually a very simple divide process in an FPGA. However, the [final] results are fairly astonishing:

$$x_{ob,m} = \frac{\gamma_m(t) \cdot a_m(\theta) s(t) + \gamma_m(t) n_m(t) + \alpha_m(t)}{\gamma_m(t) \cdot b_m s_b(t) + \gamma_m(t) n_m(t) + \alpha_m(t)} \cdot \frac{1/\{\gamma_m(t) \cdot b_m s_b(t)\}}{1/\{\gamma_m(t) \cdot b_m s_b(t)\}} =$$

$$= \frac{\frac{\gamma_m(t) \cdot a_m(\theta) s(t)}{\gamma_m(t) \cdot b_m s_b(t)} + \frac{\gamma_m(t) n_m(t)}{\gamma_m(t) \cdot b_m s_b(t)} + \frac{\alpha_m(t)}{\gamma_m(t) \cdot b_m s_b(t)}}{1 + \frac{\gamma_m(t) n_m(t)}{\gamma_m(t) \cdot b_m s_b(t)} + \frac{\alpha_m(t)}{\gamma_m(t) \cdot b_m s_b(t)}}$$

Firstly, canceling γ(t) in the numerators and denominators, results in the following simplified form:

$$= \frac{\frac{a_m(\theta) s(t)}{b_m s_b(t)} + \frac{n_m(t)}{b_m s_b(t)} + \frac{\alpha_m(t)}{\gamma_m(t) \cdot b_m s_b(t)}}{1 + \frac{n_m(t)}{b_m s_b(t)} + \frac{\alpha_m(t)}{\gamma_m(t) \cdot b_m s_b(t)}}$$

We can now use the binomial expansion, where we assume that:

$$1 \gg \left\| \frac{n_m(t)}{b_m s_b(t)} + \frac{\alpha_m(t)}{\gamma_m(t) \cdot b_m s_b(t)} \right\|$$

Then:

$$x_{ob,m} = \left[ \frac{a_m(\theta) s(t)}{b_m s_b(t)} + \frac{n_m(t)}{b_m s_b(t)} + \frac{\alpha_m(t)}{\gamma_m(t) \cdot b_m s_b(t)} \right] \cdot$$
$$\left[ 1 - \left( \frac{n_m(t)}{b_m s_b(t)} + \frac{\alpha_m(t)}{\gamma_m(t) \cdot b_m s_b(t)} \right) + \ldots \right]$$

The rest of the expansion to the right is simply higher order terms, which are negligible.

The boresight source is fixed in power, and usually set to just below the maximum receiver dynamic range level, plus some margin. This is usually around −50 dBm or greater. Thus, it can be assumed that:

$$E[s^*_b(t) s_b(t)] \gg E[n^*_m(t) n_m(t)]$$

For all m=1, 2, . . . , M
And that $$E[s^*_b(t) s_b(t)] \gg E[\alpha^*_m(t) \alpha_m(t)]$$

That is, even for significant LNA gain, on the order of 15 to 25 decibels, the resulting thermal noise power (variance) at the output of the LNA is still way below −90 dBm for most conditions.

Additionally, we assume that since the initial LNA is the 1st stage amplification (gain stage), then all resulting noise products will be below this value, independent of their statistical PDF, by at least the gain value of the LNA (again 15 to 25 dB). Therefore:

$$x_{ob,m} = \left[ \frac{a_m(\theta) s(t)}{b_m s_b(t)} + \frac{n_m(t)}{b_m s_b(t)} + \frac{\alpha_m(t)}{\gamma_m(t) \cdot b_m s_b(t)} \right] \cdot [1]$$

$$= a_m(\theta) b^*_m \cdot \frac{s(t)}{s_b(t)} + \frac{1}{b_m s_b(t)} \cdot \left[ n_m(t) + \frac{\alpha_m(t)}{\gamma_m(t)} \right]$$

Let s'(t) now represent the quotient signal:

$$s'(t) = \frac{s(t)}{s_b(t)}$$

The boresight source provides a deterministic signal, or more accurately a spectral line function. Multiplication of a Gaussian distributed process by a Gaussian distributed process results in a Gaussian distributed process, although with likely a change in its variance. Additionally, since each $b_m$ is a constant for each channel, multiplication of a Gaussian distributed process by a constant results in a Gaussian distributed process. We can also interpret this as simply a frequency shift of the original signal, s(t), by the frequency of the boresight signal, which results in a Linear Time-Invariant (LTI) process.

We can also re-write the noise term for each $m^{th}$ antenna channel as:

$$n'_m(t) = \frac{n_m(t)}{b_m s_b(t)}$$

And thus (t) is still a Gaussian distributed process, still with zero mean, but likely with a changed variance. Or viewed another way, as simply a frequency shifted (LTI) noise process.

We can now re-write the quotient response, for any $m^{th}$ channel as:

$$n'_m(t) = \frac{n_m(t)}{b_m s_b(t)}$$

Note that all stored calibration vectors, as well as any operational x data vector will now fully include the stationary (time invariant) boresight path delay, as well as the Far Field Angle of Arrival dependence, as components of the total steering vector. This final representation now appears very similar to:

$$\underline{x}(t) = \underline{a}(\theta)s(t) + \underline{n}(t) + \text{residual}$$

Where $$\text{residual} = \frac{1}{b_m s_b(t)} \cdot \begin{bmatrix} \alpha_m(t) \\ \gamma_m(t) \end{bmatrix}$$

The greater point is that for the most part, we have been able to rid ourselves of the multiplicative γ(t) in both the desired signal as well as the additive LNA Gaussian Noise, which actually is a completely unknown value in amplitude as well as in phase.

It is unknown just what is within this residual component, since it is a combination of so very many components, with unknown variance, mean, and PDF's. However, it is extremely likely that the magnitude of the residual is far less, in magnitude, than the (new) variance of the original LNA thermal noise content.

This application will cover alternate means for RF Boresighting that are not specified in the original application, patent Ser. No. 10/185,022.

There are many options for the Boresight Source, depending on the application and assumed bandwidths of Far Field received signals. For a narrowband system, a simple high resolution RF Synthesizer would be appropriate. For collection of wideband signals, the boresight source would likely be composed of a comb tone generator, outputting many tones at some pre-determined variable spectral separation value.

Covariance Boresighting:

In the prior method, each and every data sample was boresighted, as shown in (21). However, there are cases, such as Pulse Signal boresighting, which will be shown later, in which each and every Far Field Signal (280) data sample does not have an exact time correlated boresight signal (270) data sample available to boresight to. For these particular cases, boresight data samples from DDC #2 can be taken simultaneously (in time) with the Far Field data samples, output from DDC #1, or for not simultaneously. For especially the case where the two data streams, $\underline{x}_o(t)$ and $\underline{x}_b(t)$, are not taken at the same time, each separate data stream can be multiplied via outer product and form two independent covariance matrices: $R_{oo}$ and $R_{bb}$. We now form a boresighted covariance matrix by dividing each M×M component $R_{oo}$ by each component of $R_{bb}$. This resultant covariance matrix, $R_{ob}$, is then processed identically as the covariance matrix (21) obtained via sample by sample boresighting.

Figure 11:
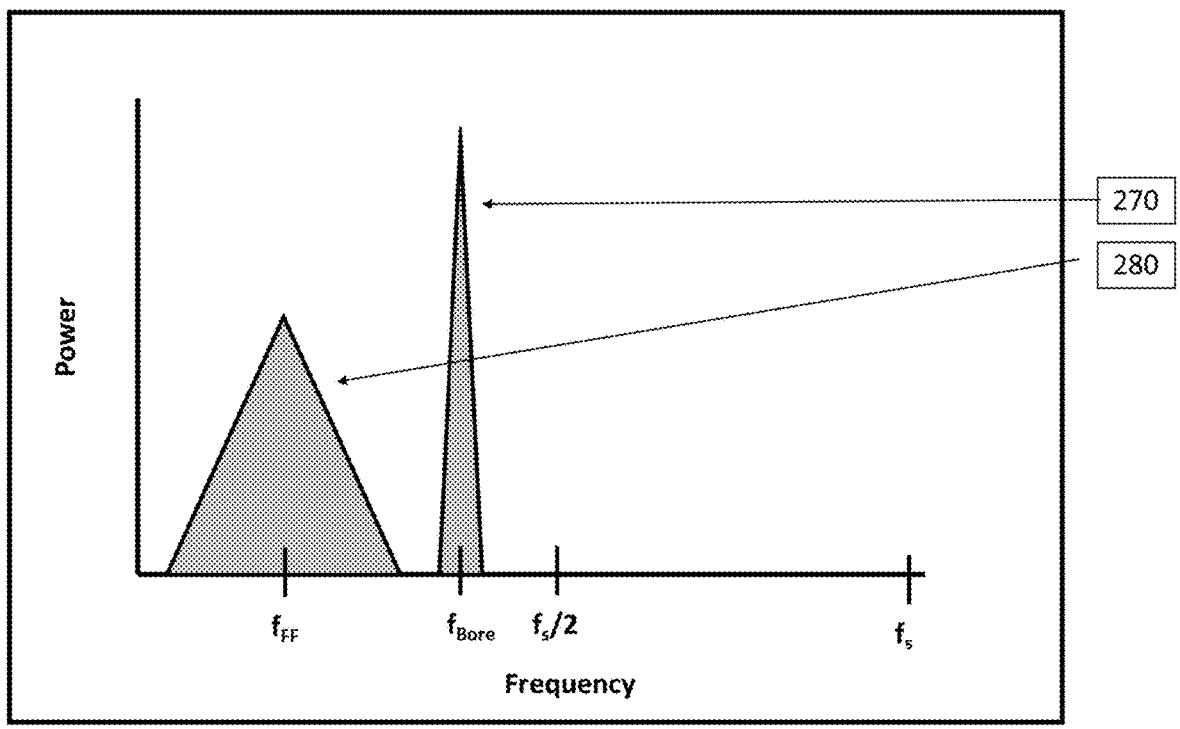
FIG. 11 shows the narrowband spectral location of far field signal and boresight tone.
Figure 12:
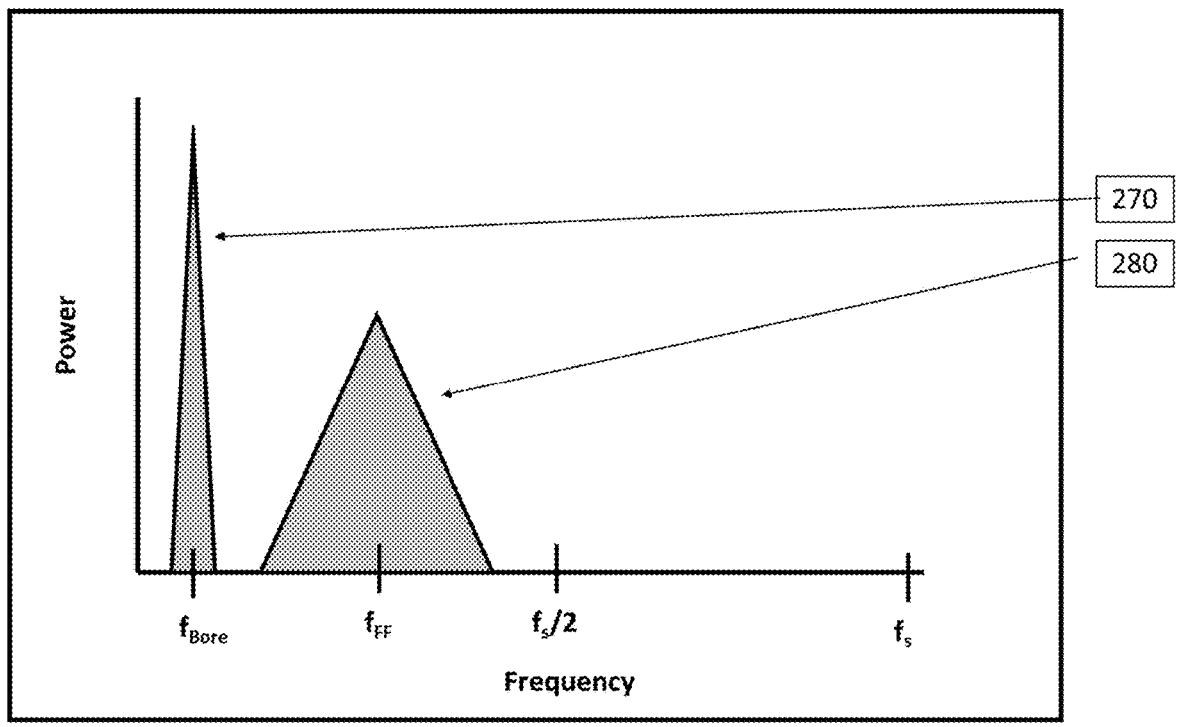
FIG. 12 shows an alternate narrowband spectral location of far field signal and boresight tone

Optimal Placement of $f_o$ and $f_b$ for a Narrowband System:

For signals bandwidths that are less than 0.1% of the carrier frequency, a relative definition of a narrowband signal, it is desired to place the boresight signal [frequency] as close to the desired Far Field signal [frequency], however, assuring that there is no significant spectral overlap of the two signals. There are numerous methods and types of boresight signals, that can be utilized, however use of extremely narrowband tone signals have been found to work the best. For example, in the current Applicant's system, for a desired Far Field signal bandwidth on the order of 25 kHz or less, the boresight tone [frequency] is placed roughly 25 kHz above the desired Far Field center frequency. This system is shown in FIG. 11. Both signals are sampled within the Nyquist (real) rate of $f_s/2$. There are two desirable rules to attempt to follow in this case. Firstly, that the two signals, (270) and (280), are as close together as possible, and secondly with minimal spectral overlap of signal energy (power) between the two signals. FIG. 11 shows the baseband representation (after downconversion) of the two signals, with the boresight signal (270) frequency greater than the desired Far Field signal (280) frequency. Alternatively, as shown in FIG. 12, the boresight signal (270) frequency can be selected to less than the desired Far Field signal (280) frequency. Either method should operate effectively, as long as the two signals, (270) and (280), are as close together as possible, and with minimal spectral overlap of signal energy (power) between the two signals.

Figure 13:
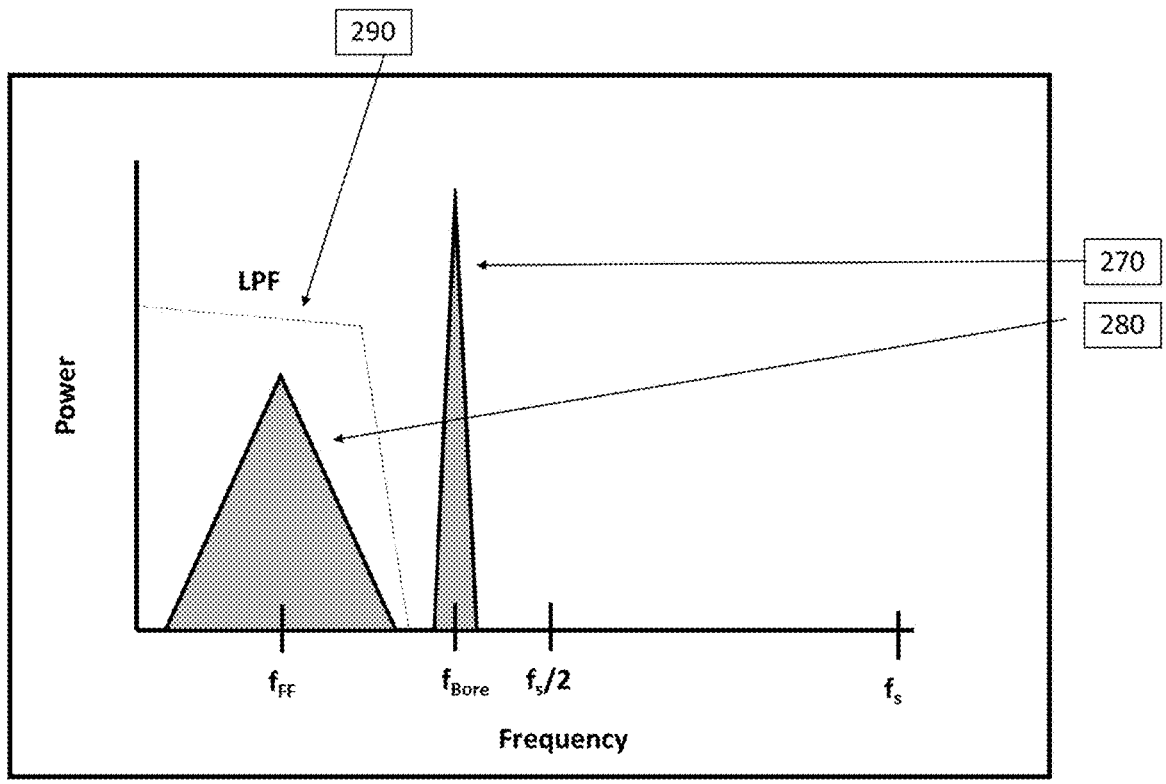
FIG. 13 illustrates the low pass filtered signal. This case is the desired far field signal.

After downconversion of the signals to baseband and digitized by the ADC, each separate signal (270) and (280) are digitally filtered. FIG. 13 shows the placement structure of FIG. 11, where the lower signal, the desired Far Field signal (280) is digitally low pass (290) filtered, with a filter cut-off frequency in the spectral gap between the two signals. This filter (290) can also be a digital band pass filter, however, a low pass filter will likely be more optimal for this spectral arrangement.

Figure 14:
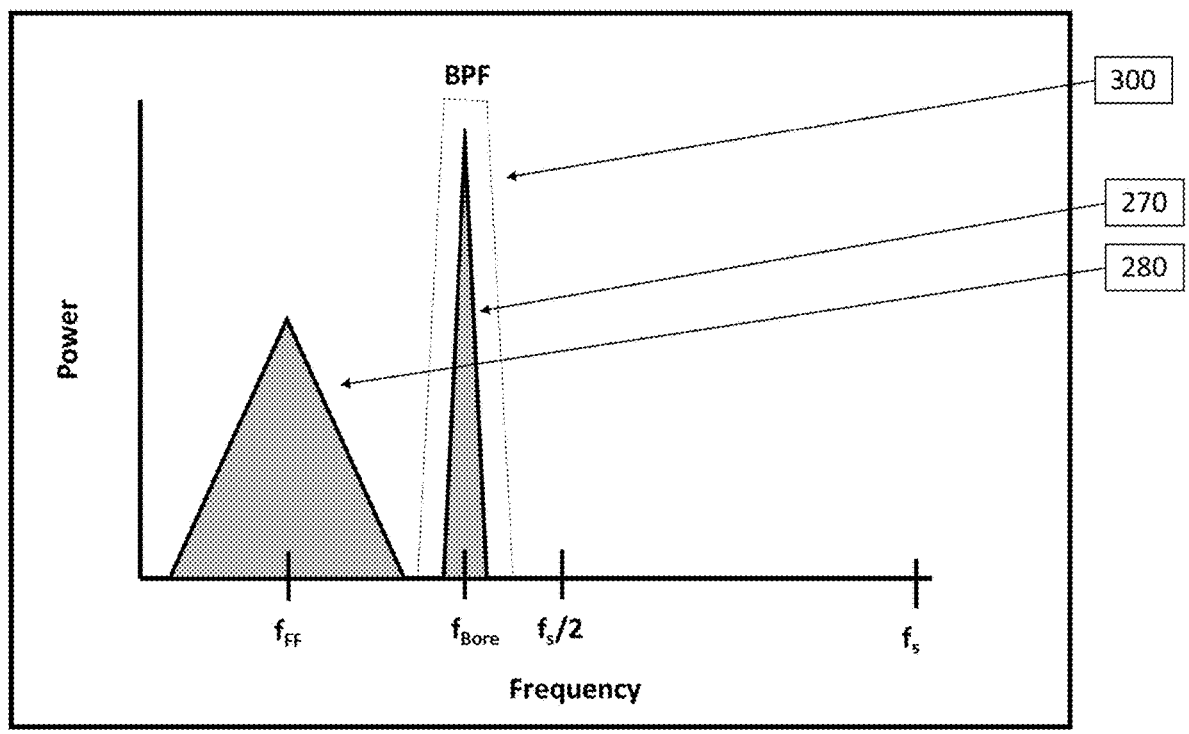
FIG. 14 shows the band pass filtered signal. This case is the boresight signal.

FIG. 14 shows the placement structure of FIG. 11, where the upper (spectral) signal, the boresight signal (270) is digitally band pass (300) filtered, with a filter cut-off frequency in the spectral gap between the two signals.

For example, for a carrier frequency of 100 MHz and above, this means that the bandwidth to carrier ratio is roughly 0.00025, or less than 0.025%, which obeys the narrowband signal model. For FIG. 11, the back end DDC (e.g. DDC #2), which filters the boresight signal (270), is therefore set with a very narrowband bandwidth, on the order of roughly 5 kHz. This method assures extremely little leakage either from the Desired Signal (280) into the boresight tone signal (270), and vice versa. This is verified by analyzing the eigenvalues for the output of both DDC's, e.g. DDC #1 output with the desired Far Field signal (280) and DDC #2 output with the boresight tone signal (270). For both signals, the difference between the first and second largest eigenvalues, for each $m^{th}$ channel, is desired to be at least 50 dB, thus assuring signal leakage less than 50 dB. It can generally be stated, that separation of the desired Far Field signal (280), by a boresight tone signal (270) by an amount that generates a high separation of the $1^{st}$ and $2^{nd}$ eigenvalues, on the order of 40 to 50 dB, will result in very good data performance. Without loss of generality, this example can be extended to many different signal bandwidths as well as boresight bandwidths, and spectral separation values.

It should be mentioned that the methodologies used in FIGS. 11 through 14 apply equally to not just the system calibration process, but also to system operation and use, especially for narrowband Far Field Signals.

Figure 15:
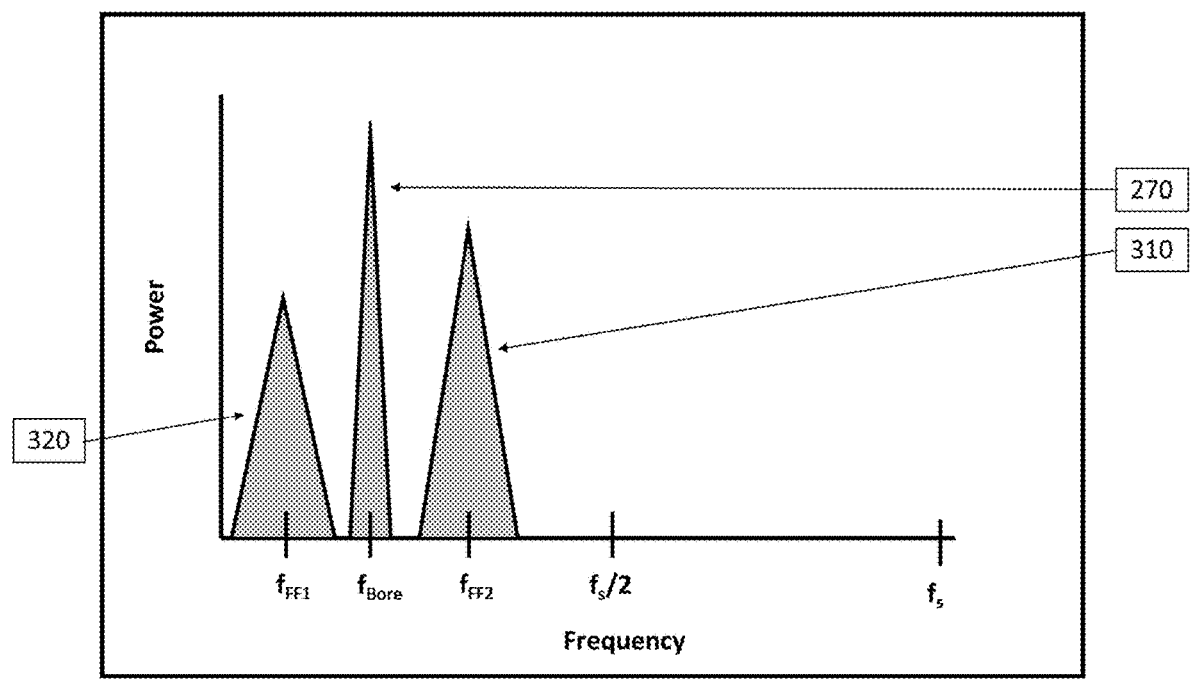
FIG. 15 shows two diversely polarized calibration signals, and one boresight signal.

Calibration for Diverse Polarization:

We have thus so far only described the calibration condition for a single polarization. For dual or diverse polarization calibration, shown in FIG. 15, we can employ three (3) DDCs, such that we can simultaneously collect two Far Field signals, (310) and (320), each with signal polarization orthogonal to one another. For methodologies that required two independent and diverse calibrations, this reduces the number of required aircraft flights by a factor of two times. Notice that the same boresight signal, (270) can be used to boresight both Far Field calibration signals, (310) and (320). Alternatively, one could fly and collect vertical polarized calibration signals during one interval or flight, and then collect horizontally polarized calibration signals during another interval or (separate flight).

However, since flight time is expensive, it is far more efficient to simply install two spatially separated Far Field transmitters, each with orthogonally polarized antennas, and collect multi-polarized Cal during a single interval or flight. Using this method, both DDC #1 (with the vertically polarized Far Field signal) and DDC #3 (with the horizontally polarized Far Field signal) can use the same boresight signal (270) from DDC #2, for each and every antenna channel.

In calibration mode, all signals used are typically narrowband, however, wideband signals and use of Discrete Fourier Transforms (DFTs) can also be used. Thus, far field signals could be confined to tone signals, and would be spectrally located in frequency bins appropriate for a given desired frequency spacing interval. It would be obvious to one skilled in the art that many different spectral positions or arrangements could be developed, all with the same basis related to FIG. 15.

Figure 16:
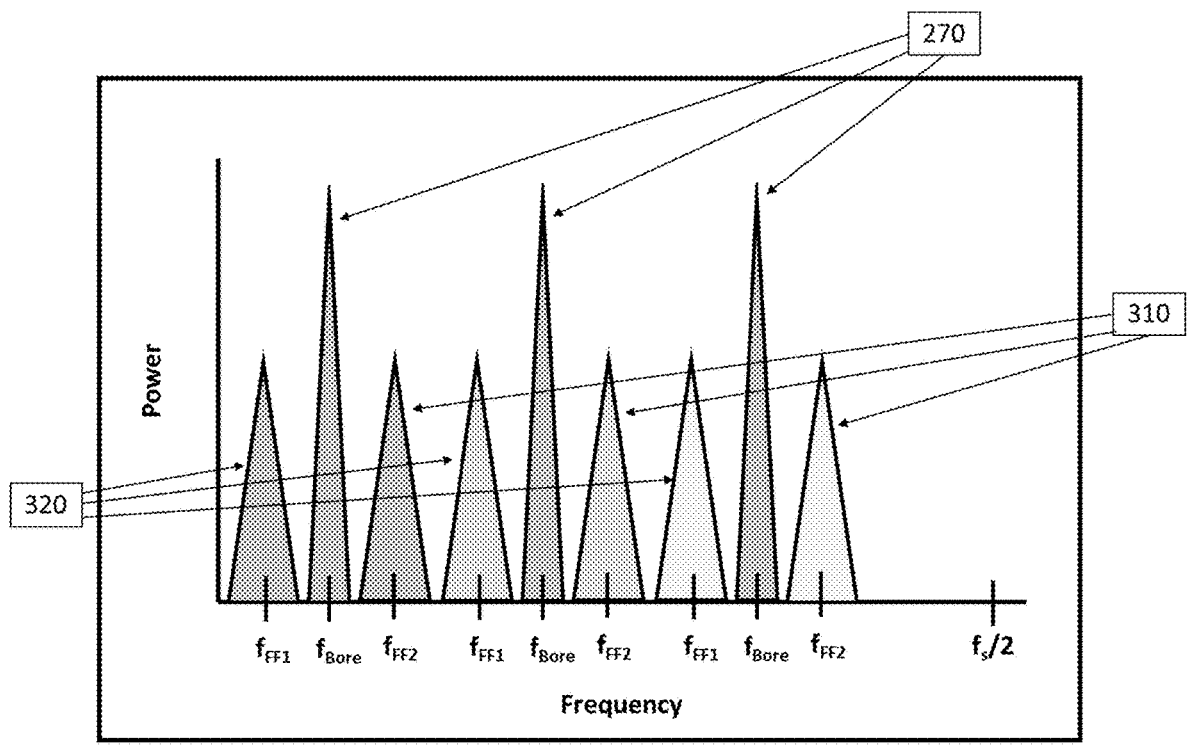
FIG. 16 shows multiple diversely polarized calibration signals, and multiple boresight signals.

For example, FIG. 16 shows one such possible spectral configuration of signals, at baseband after downconversion. A collection of boresight signal tones (270) can all be simultaneously output from the boresight signal source (130), and continuously feed to each receiver channel (30). Groups of Far Field signals, with a given signal polarization (320), can either simultaneously be transmitted from the Far Field or incrementally transmitted at different time intervals, time synchronized to a common system (airborne and ground) clock. These represent Far Field signal #1, emitted by Far Field source #1 and Far Field antenna #1, although at different frequencies. These are likely tone signals, but could be any signal modulation. Simultaneously, or time synchronized and stepped incrementally, are Far Field calibration signals (310), emitted from Far Field source #2 and Far Field antenna #2, that are spatially orthogonal to the other signal set (320). Finally, the comb of boresight signals, emitted from (130), are shown by (270). It would be obvious to one skilled in the art, that there are literally an infinite number of system architecture and spatial position and timing variations of the system shown in FIG. 16.

Wideband Model/Solution in Operation:

Up to this point, all mathematics and technology solutions have been limited to the Narrowband model. Again, the definition of Narrowband is usually restricted to signal bandwidths less than 0.1% of the carrier frequency. For spatial array processing applications like Direction Finding and/or Radar, where the desired Far Field signal(s) may have very large bandwidth(s), it might be impossible to simply spectrally separate the desired signal from the boresight signal, such that they have near zero spectral [power] overlap. Additionally, optimal performance boresighting requires that the boresight signal frequency be close to the desired Far Field signal frequency to be used in operation.

Most applications using wideband signals for these applications either use or could use a channelized approach. For Direction Finding/RF Geolocation, this is the conventional approach to operating with wideband signals. There are numerous means to achieve this. One is to simply to position all the boresight signals, generated from a comb tone generator, to be aligned with the FFT (or DFT) channel edges. Testing and research has shown that extremely high bearing angle accuracies can be achieved with calibration frequency separation of roughly 5% to 10% maximum, and frequency interpolation. That is, for a frequency of 100 MHz, the next higher frequency Cal set should be collected at roughly 105 MHz. Interpolation between the calibration sets of 100 and 105 MHz will still produce extremely high bearing angle accuracies. Thus, boresight comb generators would need to produce (tone) combs spaced no greater than 5 MHz apart, and finer resolution combs can simply be interpolated from the collected comb tone signals.

In operation, injection of the boresight signals will be adjusted such that the boresight signals power, in each spectral bin, should be much greater than the wideband Far Field signal within the same bin. It is desired that the receiver would have dynamic range on the order of 16 bits or larger, thus 96 dB of dynamic range. Assume that the bit saturation (all ones) is associated with a power level of −30 dBm, in the receiver (with zero receiver attenuation), referenced to the input of the receiver. In this mode, with margin, the largest signal that can be measured is somewhere between −30 to −40 dBm (assuming 10 dB of variance margin). Then all boresight signals could be adjusted for a −40 dBm maximum input power level into the receiver, compensating for losses through the RF splitter (140) and RF couplers (170). In the wideband case, the received power of a desired Far Field signal could be spread across many frequency bins. Assume that the average power, of this signal, in any bin is roughly −90 dBm (or less). Then the ratio of the boresight signal, to the received signal, per bin, would be roughly 50 dB. At this level, compared to the boresight signal power, the wideband signal within the same bin is simply considered noise. For lower power received wideband signals, the boresight signal power(s) can be reduced, and still assure a 50 dB difference in power. It would be obvious to one skilled in the art that there are many variations of this architecture, with equivalent power and separation of power values.

In general, there are four cases for boresighting:

1. $f_{FF} \neq f_b$ that is, any desired far field signal is not at the exact same frequency as any boresight signal, and $t_1 = t_b$ any desired Far Field signal is collected (a time synchronized to) at the same time the adjacent boresight signal that it uses for boresighting.

2. $f_{FF} = f_b$ that is, any desired far field signal is at the exact same frequency as any boresight signal, and $t_1 \neq t_b$ any desired Far Field signal is not collected (a time synchronized to) at the same time the adjacent boresight signal that it uses for boresighting.

3. $f_{FF}=f_b$ that is, any desired far field signal is at the exact same frequency as any boresight signal, and $t_1=t_b$ any desired Far Field signal is collected (a time synchronized to) at the same time the adjacent boresight signal that it uses for boresighting.

4. $f_{FF} \neq f_b$ that is, any desired far field signal is not at the exact same frequency as any boresight signal, and $t_1 \neq t_b$ any desired Far Field signal is not collected (a time synchronized to) at the same time the adjacent boresight signal that it uses for boresighting.

It should be noted that case (1) spectral ($f_{FF} \neq f_b$) and temporal condition ($t_1=t_b$) is exactly the case presented so far in all narrowband calibration and operation methods.

Figure 17:
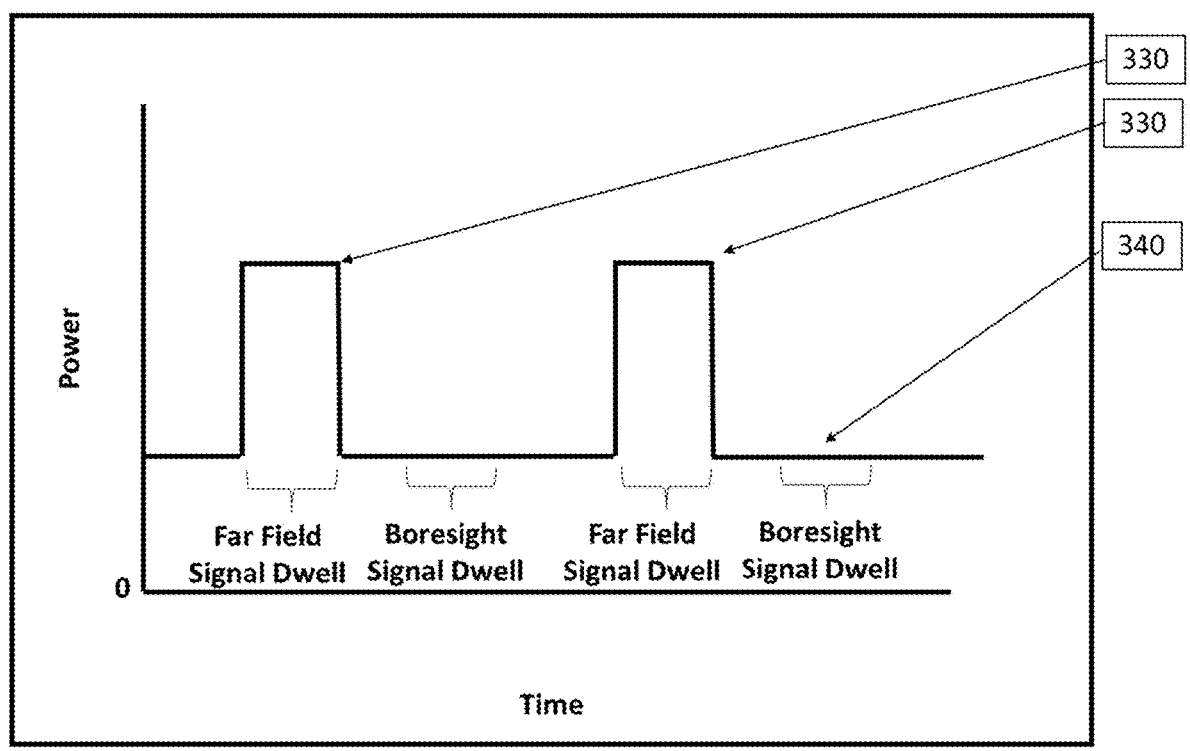
FIG. 17 illustrates pulse signal RF Boresighting.

Case (2) could apply to Pulse Signals, both narrowband and wideband. FIG. 17 shows a case for a conventional pulse signal, in the time domain. At the input to each receiver channel, the pulse signal energy (330), for a duty factor less than unity (or 100%) is denoted by the rectangular area above some relative noise floor (340). Assuming that the pulse ramp up power is sufficiently detected and time synchronized, with the ramp down of the pulse, then a series of vector data samples, $\underline{x}(t)$, can be collected and associated with the Far Field signal energy. Assume that this Far Field signal (pulse) is centered at frequency $f_{FF}$. The time between pulse can thus be used, and synchronized with the boresight source (130), to output boresight signal (270) and (340) energy only during the times between the pulses. Using this method, the boresight source (270) frequency, $f_b$, can be at the same frequency as the desired Far Field signal (330), thus $f_{FF}=f_b$. Note, this method needs accurate synchronization and time stamping of all data samples, to assure that no Far Field Pulse Signal (330) data samples or boresight signal (340) data samples are mixed into each other. The vector samples, $\underline{x}_o(t)$, in the Pulse Signal dwell time are then outer product multiplied to form the Data covariance matrix, $R_{oo}$, and the boresight vector data samples, $\underline{x}_b(t)$, collected in the non-pulse time frame are outer product multiplied to form a boresight covariance matrix, $R_{bb}$. We now form a boresighted covariance matrix by dividing each M×M component $R_{oo}$ by each component of $R_{bb}$. This resultant covariance matrix, $R_{ob}$, is then processed identically as the covariance matrix (21) obtained via sample by sample boresighting. This method does not produce as good as the results from sample-to-sample boresighting, however, for very short pulse lengths, the results should still result in very high accuracy bearing angle estimates.

Note, that for fairly narrowband pulses, that this method could work in operation using only a single boresight signal.

This method is also likely preferred for pulse signals (FIG. 17) that are not extremely wideband, for example bandwidth less than 1% of the carrier frequency, since for very wideband pulses, the frequency of the center boresight signal (340) might be spectrally too far away from the signal content at the extreme frequency edges. This could produce undesired errors in the bearing angle estimate. It should be noted that the method in FIG. 17 is also an example of Case (2), where $f_{FF}=f_b$ and $t_1 \neq t_b$, and would subsequently also use Covariance Based RF Boresighting.

Figure 18:
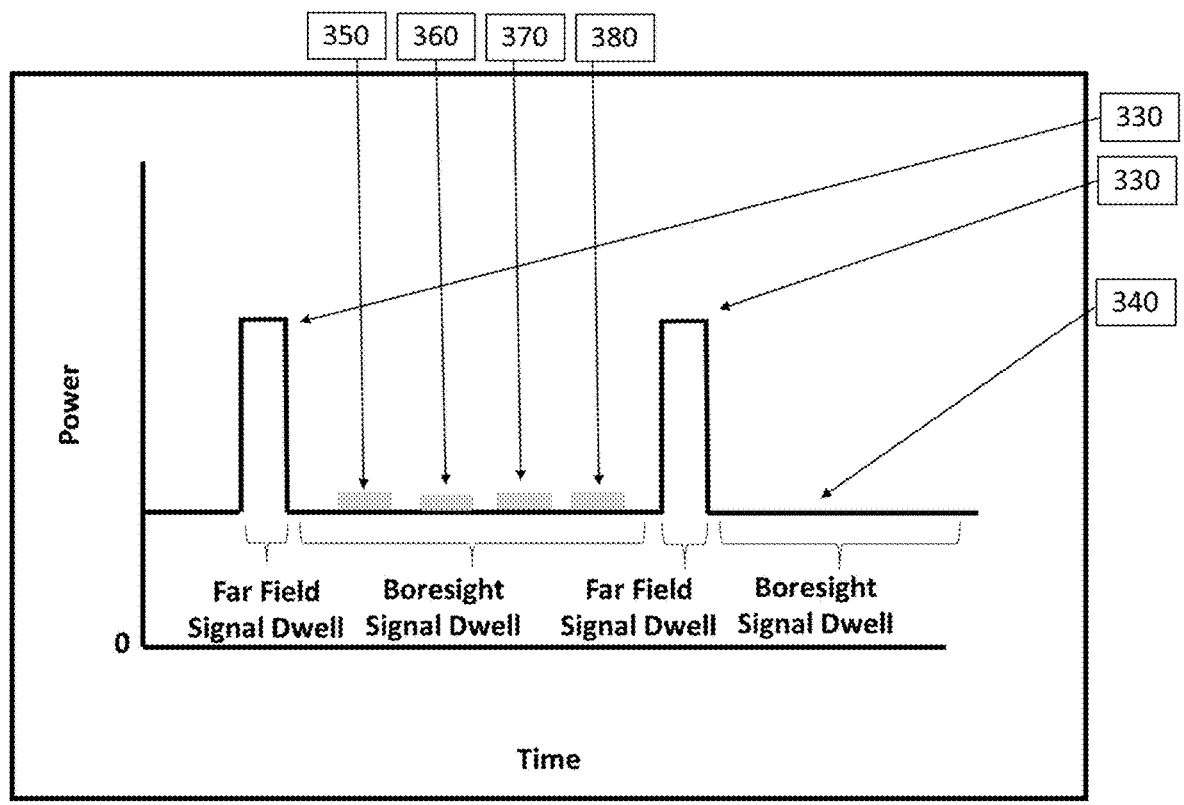
FIG. 18 shows very wideband pulse signal RF Boresighting.

Very Wideband Signals:

In operation against very wideband signals, where the total continuous or pulse signal bandwidth exceeds 1% of the carrier frequency, it is desired that many boresight signals be used. As shown in FIG. 18, for the pulse signal case, and especially for low [pulse signal]duty cycles, we can sample in the non-signal (on) time between pulses to collect multiple boresight signals, (350), (360), (370), (380), each at a different respective boresight signal frequency, $f_{b1}$, $f_{b2}$, $f_{b3}$, $f_{b4}$. For this example, we have used four such boresight signals, each with a different frequency across the wideband signal bandwidth, however without loss of generality this can be extended to any number of boresight signals and frequencies (FIG. 18).

Subsequently, after FFT or DFT processing, any frequency bin energy to be boresighted would use the boresight signal spectrally closest to it for boresighting. It should be noted that the method in FIG. 18 is also an example of Case (2), where $f_{FF}=f_b$ and $t_1 \neq t_b$, and would subsequently also use Covariance Based RF Boresighting.

Figure 19:
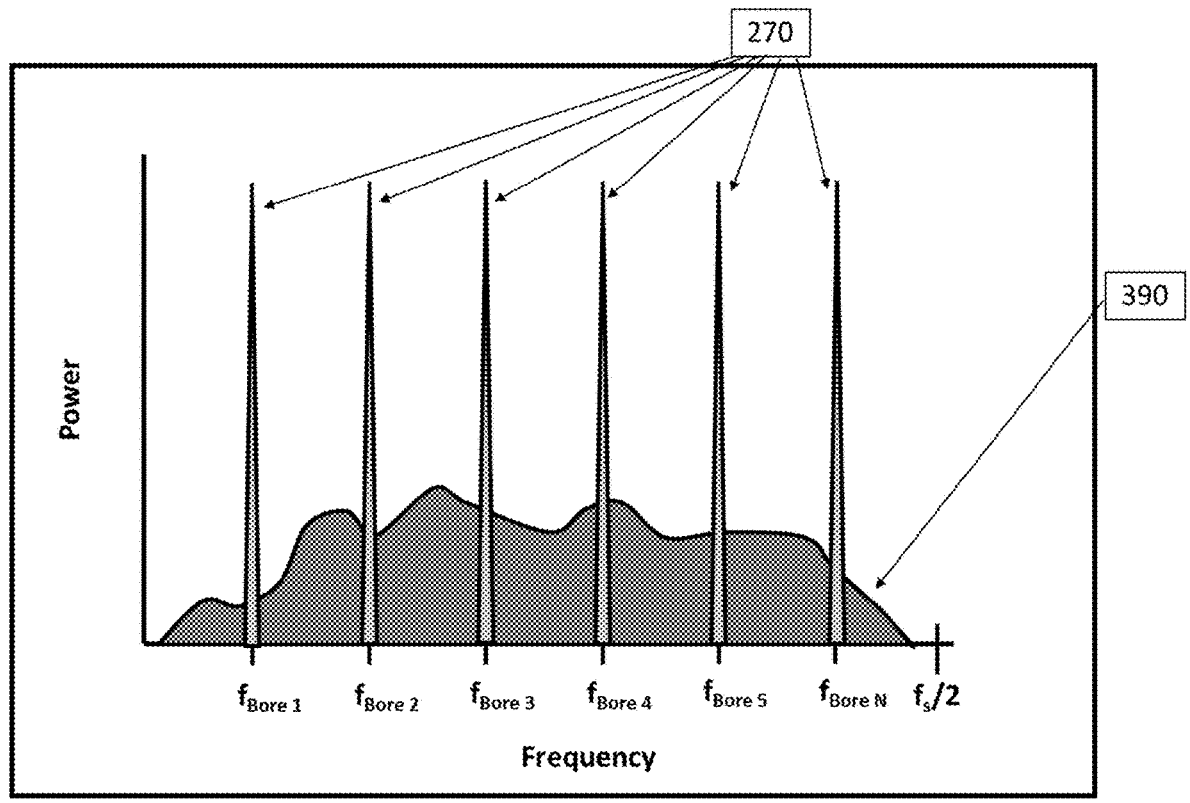
FIG. 19 shows very wideband continuous signal RF Boresighting.

For the case of continuous time wideband signals, which would align with case (3) above, there are no gaps in time that can be exploited in which boresight signals can be placed and not spectrally overlap the wideband Far Field signal. In this case, boresight signals (270) will need to be placed along equal or even non-equal spacings in frequency, all along the spectral width of the Far Field Very Wideband signal (390), which is shown more clearly in FIG. 19.

Figure 20:
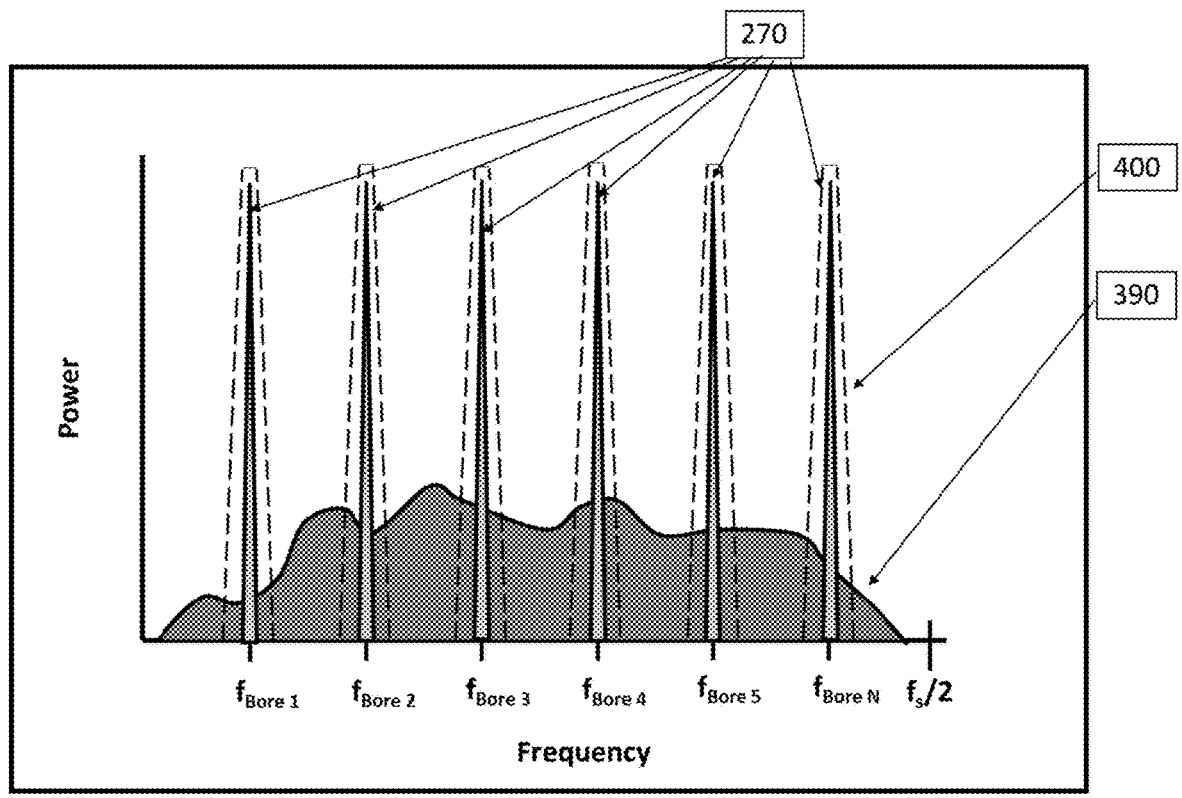
FIG. 20 shows multiple band pass filters for very wideband continuous signal RF Boresighting.

While it may be possible to generate boresight signals (270) that are far greater in power than the spectral FFT or DFT bin energy of an individual FFT bin of the wideband Far Field signal (390), this situation cannot be guaranteed. This is also the case where the system dynamic range is reduced, and there may not be sufficient dynamic range to generate boresight signals 50 dB or greater than the Wideband Far Field signal (390) energy, within each DFT or FFT bin. Since each boresight signal (270) bandwidth is extremely narrow, say 1 kHz or less for a tone, and the bandwidth of the wideband signal (390) is expected on the order of 1 MHz to 2 GHz, then the amount of energy with the spectral summation of all boresight signals (270) can still be 100 to 10,000 less than the combined energy of the full wideband Far Field signal (390). Therefore, we should be able to form very sharp narrow band Pass Band Filters (400) at the output of DDC #2 (240), for each the boresight signals (270), and only pass signal energy for the boresight signals, as shown in FIG. 20.

Figure 21:
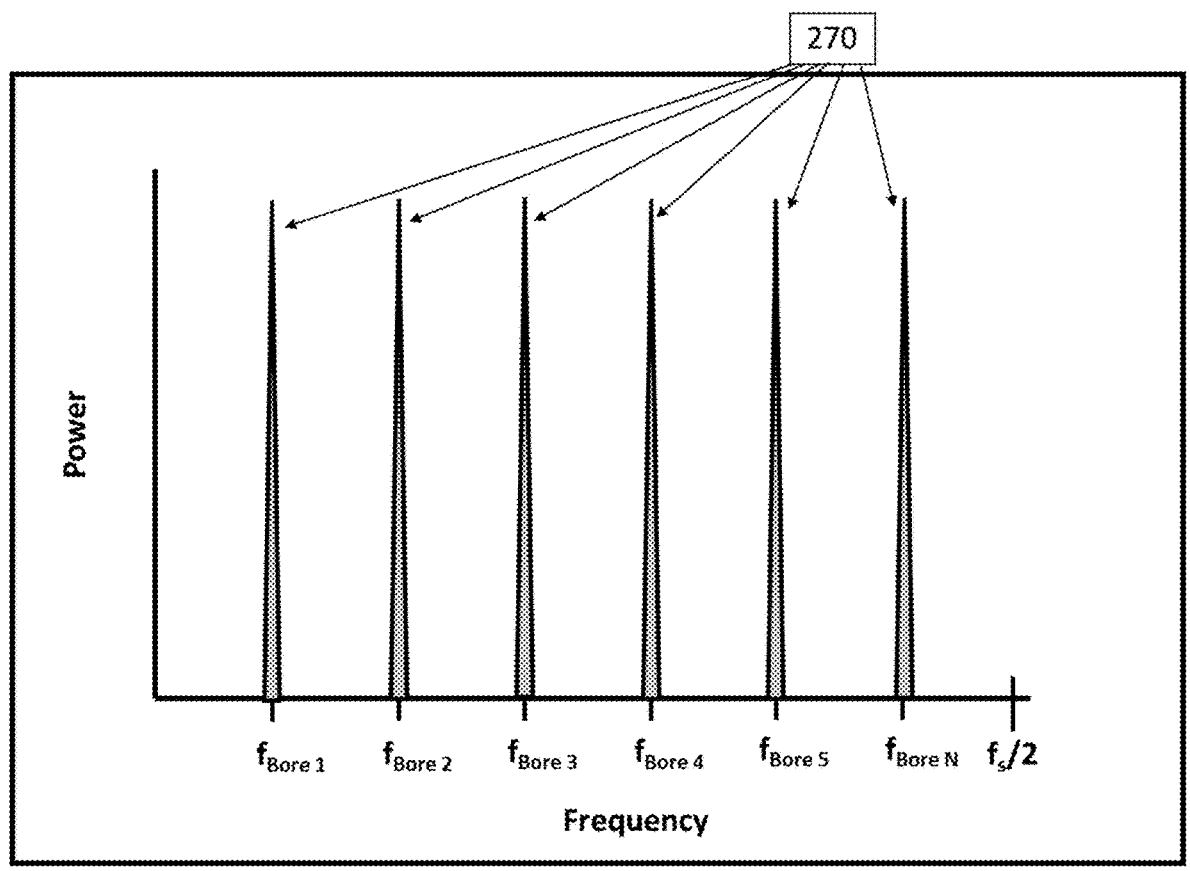
FIG. 21 shows multiple boresight tones, after bandpass filtering thru DDC #2.

In doing so, the output of DDC #2 (240), for each antenna channel, would simple be the collection of boresight signals (270), as shown in FIG. 21. Here, we have eliminated nearly all the energy of the continuous Wideband signal, only leaving the boresight signals (270), tones, at their respective spectral locations. This could be performed either through a comb of bandpass filters (400), or sequentially with a single filter at each boresight tone (frequency) at a time.

Figure 22:
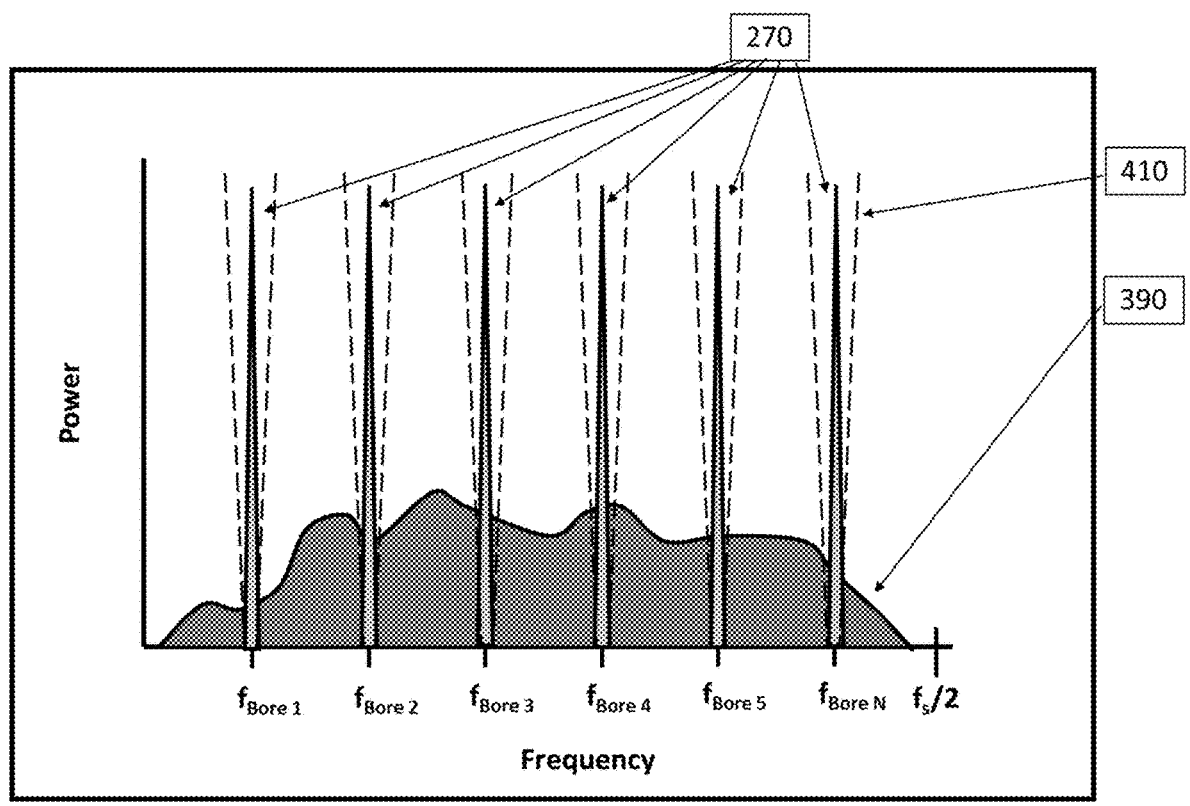
FIG. 22 shows multiple notch filters for very wideband continuous signal RF Boresighting.
Figure 23:
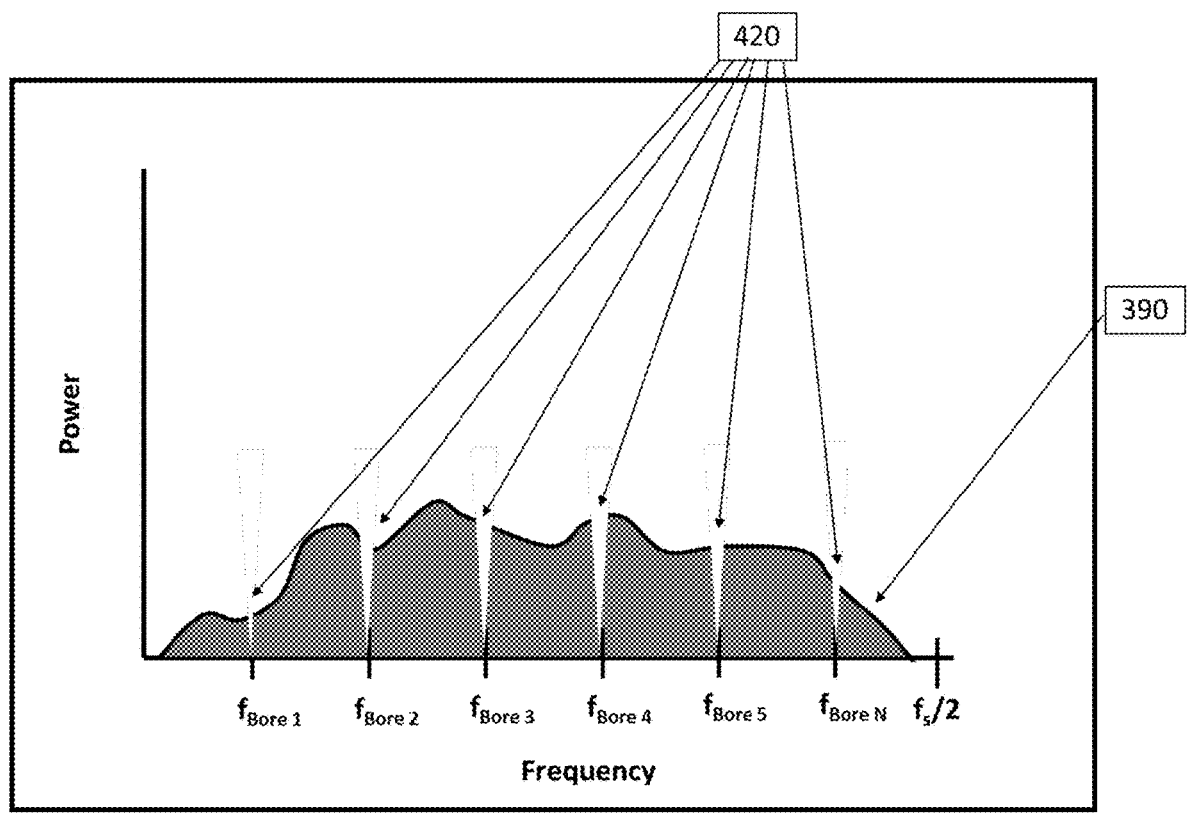
FIG. 23 shows multiple notch holes for very wideband continuous signal RF Boresighting.

For the output of DDC #1 (230), we only want the wideband signal to pass through. Similar to the previous step, where we formed N Band Pass Filters (BPF) around each of the boresight signal (270) tones, to only pass the tones through, here we will form N Narrow Notch Filters, to only pass the Wideband Far Field Signal through DDC #1 (230). It should be mentioned that our definition for the DDC (Digital Down Converter) also will include the respective desired filter. FIG. 22 shows the case for N notch filters, each rejecting the boresight signal energy passed through DDC #1 (230). The resulting signal at the output of DDC #1 (230), for each antenna channel, is shown in FIG. 23. Spectral notched "holes" (420) are shown in the Far Field Wideband Signal (390), where the notch filters have been spectrally assigned. Again, these could be performed either through a comb of notch filters (420), or sequentially with a single notch filter at each boresight tone (frequency) at a time. It should be mentioned that the resulting wideband signal could be very negligibly affected since the boresight signal (270) bandwidths are so extremely narrow, and that equivalently narrow notched filters would be used which would effectively remove less than 1% of the Wideband Signal Energy and structure. It should be noted that the method in FIG. 18 is also an example of Case (3), where $f_{FF}=f_b$ and $t_1=t_b$, and would subsequently also use Sample-to-Sample Boresighting as most desired, however, Covariance Based RF Boresighting could also be used.

What is claimed is:

1. A method of signal calibration comprising:
   a received arbitrary far field signal; comprised of any signal waveform, received by a multiplicity of antennas, denoted as the array system, wherein each antenna represents a unique signal channel;
   wherein each far field signal from each antenna channel, with a time or phase difference from the other antenna channels within the array system, is combined with an internally generated split signal copy, denoted as a boresight signal, from a single RF Synthesizer or a single comb signal generator;
   wherein both the far field signal and the boresight signal, for each antenna channel, are combined via an RF coupler, one for each antenna channel, and then downconverted and digitally sampled, to produce a set of phased array antenna channels each with an embedded calibration boresight signal within a specified frequency band;
   wherein the far field and boresight calibration matrices, for each antenna channel, are later processed to improve signal quality, on each antenna channel.

2. The method of signal calibration of claim 1 where the array system is calibration boresighted by filtering a digitized and stored composite signal from each antenna channel to produce two independent data streams, $\underline{x}_o(t)$ for the far field signal and $\underline{x}_b(t)$ for the boresight signal; wherein this process is performed when the two data streams are not time synchronous, or when the two data streams are not captured at the same RF dwell times, wherein each separate data stream is processed via outer product multiplication and forms two independent covariance matrices: $R_{oo}$ and $R_{bb}$, respectively; wherein the two independent covariance matrices are processed by dividing each M×M component of $R_{oo}$ by each component of $R_{bb}$, to derive a final boresighted corrected data matrix; wherein this process is denoted as Covariance Matrix Boresighting.

3. The method of signal calibration of claim 1 where the boresight signal is spectrally above or below far field signal, wherein, the far field and boresight signals are as spectrally close as possible with no signal overlap of energy between the two signals; wherein downconversion of the signals to baseband, and digitized by an Analog to Digital Converter, each separate signal, the far field signal and the boresight signal, are digitally filtered, wherein when the far field signal is lower in frequency than the boresight signal, the desired far field signal is subsequently digitally low pass filtered, with a filter cut-off frequency in a spectral gap between the two signals, and the boresight signal is then high pass filtered, with a similar cut-off frequency; wherein the filter for both signals can also be a digital band pass filter; wherein, conversely, the boresight signal is spectrally placed at a frequency below the far field signal, and the boresight signal is low passed filtered with a spectrally higher far field signal high pass filtered, with a filter cut-off frequency in the spectral gap between the two signals; wherein, alternatively, both signals can be band pass filtered.

4. The method of signal calibration of claim 1 for dual or diverse signal polarization calibration, wherein for this method, three digital downconverters are used for each antenna channel, to enable simultaneous collection of two far field signals; wherein each has signal polarization orthogonal to one another; wherein the same boresight signal is used to calibrate boresight for both far field orthogonally polarized calibration signals; wherein a multiplicity of independent far field signals all within a given band, with a fixed signal polarization, are simultaneously transmitted from the far field at a specified stationary location; wherein this multiplicity of radiated far field signals generated by far field source #1, are emitted by far field source #1 and far field antenna #1 at a given polarization, denoted as polarization #1; wherein these far field signals from source #1 could be any signal modulation, but are usually tone signals; wherein when simultaneously transmitted, time synchronized and stepped incrementally, become a second set of far field calibration signals, wherein a multiplicity of independent far field signals all within a given band similar to that of source #1, with a fixed signal polarization, are simultaneously transmitted from the far field at a specified stationary location; wherein this multiplicity of radiated signals generated by far field source #2, are emitted by far field source #2 and far field antenna #2 at a given polarization, are denoted as polarization #2; wherein the polarization of far field source antenna #1 is orthogonal to the polarization of far field source antenna #2, wherein the locations and proximity of far field source antenna #1 and far field source antenna #2 are sufficiently separated to product negligible mutual coupling between the two source antennas and therefore the two different composite radiated signal groups, wherein these far field signals from source #1 could be any signal modulation, but are usually tone signals; wherein boresight signals, generated within the system, are spectrally placed at frequency locations between these far field signals; wherein it would be obvious to one skilled in the art, that there are numerous different system architectures and spatial positions for the signals that could implement this solution of system.

5. The method of signal calibration of claim 1 where comb generation calibration boresighting is used to calibration over a wide band of signal operation, and to produce two independent far field polarized signals; wherein a collection of boresight signal tones is simultaneously output from the boresight signal source and split to each independent signal channel, being combined with the far field signal through a signal combiner, and subsequently continuously feed to each receiver channel; wherein a multiplicity of independent far field signals all within a given band, with a fixed signal polarization, are simultaneously transmitted from the far field at a specified stationary location; wherein this multiplicity of radiated signals generated by far field source #1, are emitted by far field source #1 and far field antenna #1 at a given polarization, denoted as polarization #1; wherein these far field signals from source #1 could be any signal modulation, but are usually tone signals; wherein simultaneously transmitted, time synchronized and stepped incrementally, are a second set of far field calibration signals; wherein a multiplicity of independent far field signals all within a given band similar to that of source #1, with a fixed signal polarization, are simultaneously transmitted from the far field at a specified stationary location; wherein this multiplicity of radiated signals generated by far field source #2, are emitted by far field source #2 and far field antenna

2 at a given polarization, denoted as polarization #2; wherein the polarization of far field source antenna #1 is orthogonal to the polarization of far field source antenna #2, wherein the locations and proximity of far field source antenna #1 and far field source antenna #2 are sufficiently separated to product negligible mutual coupling between the two antennas and therefore the two different composite radiated signal groups, wherein these far field signals from source #1 could be any signal modulation, but are usually tone signals; wherein boresight signals, generated within the system, are spectrally placed at frequency locations between these far field signals; wherein it would be obvious to one skilled in the art, that there are numerous different system architectures and spatial positions for the signals that could implement this solution of system.

6. The method of signal calibration of claim 1 where for calibration of continuous time wideband signals, where a total continuous or pulse signal bandwidth exceeds 1% of the carrier frequency; wherein a multiplicity of boresight signals, generated within the system as specified in claim 3, are spectrally located along equal or even non-equal spacings in frequency, all along the spectral width of the far field wideband signal.

7. The method of signal calibration of claim 1 where for calibration of continuous time wideband signals that a multiplicity of narrowband tones are copied, similar for each antenna channel, and injected into and through an RF combiner, for each independent channel, to provide a multiplicity of evenly spaced or non-evenly spaced tones, which are summed with the far field signal, through the RF coupler; wherein after digitization of each antenna channel, narrowband boresight signals are removed via comb band pass filters and a resultant composite signal of boresight signals is digitally frequency channelized, into sub bands, using an appropriate digital frequency channelizer, such as a Fast Fourier Transform, to separate out each individual tone boresight signal; wherein each boresight signal at a given spectral location sub band is processed to form a boresight covariance matrix, as specified in claim 2; wherein the wideband signal is extracted by employing comb notch filters at the locations of boresight tones, to remove the boresight tones, with this composite signal then frequency channelized using a similar channelizer to the boresight signals, and at the same spectral locations as the boresight signals; wherein the frequency channelized band signal streams of the original wideband signals are used for far field frequency channelized covariance matrices, as specified in claim 2; wherein for each frequency channelized sub band, the frequency channelized boresight covariance matrices are divided by the same frequency channelized far field covariance matrices, on a matrix element basis, to generate a multiplicity of resultant boresight calibrated frequency channelized covariance matrices, each of dimension M×M.

8. The method of signal calibration of claim 1 wherein pulse signal calibration is performed using the Covariance Boresighting technique of claim 2; wherein the far field pulse signal is collected during a short RF dwell equal to the pulse length; wherein the boresight signals are collected when the far field pulse signal is off; wherein the sample data vectors for the far field pulse signal are then outer product multiplied to produce a far field covariance matrix and then when off, a boresight signal is injected through the RF combiners to produce sample data vectors for boresighting, which are then outer product multiplied to produce a boresight covariance matrix; wherein the two matrices are divided by one another, on a matrix element basis, to produce a final M×M calibrated covariance matrix.

9. A system of signal calibration comprising:
a received arbitrary far field signal; comprised of any signal waveform, received by a multiplicity of antennas, denoted as the array system, wherein each antenna represents a unique signal channel;
wherein each far field signal from each antenna channel, with a time or phase difference from the other antenna channels within the array system, is combined with an internally generated split signal copy, denoted as a boresight signal, from a single RF Synthesizer or a single comb signal generator;
wherein both the far field signal and the boresight signal, for each antenna channel, are combined via an RF coupler, one for each antenna channel, and then downconverted and digitally sampled, to produce a set of phased array antenna channels each with an embedded calibration boresight signal within a specified frequency band;
wherein the far field and boresight calibration matrices, for each antenna channel, are later processed to improve signal quality, on each antenna channel.

10. The system of signal calibration of claim 9 where the array system is calibration boresighted by filtering a digitized and stored composite signal from each antenna channel to produce two independent data streams, $\underline{x}_o(t)$ for the far field signal and $\underline{x}_b(t)$ for the boresight signal; wherein this process is performed when the two data streams are not time synchronous, or when the two data streams are not captured at the same RF dwell times, wherein each separate data stream is processed via outer product multiplication and forms two independent covariance matrices: $R_{oo}$ and $R_{bb}$, respectively; wherein the two independent covariance matrices are processed by dividing each M×M component of $R_{oo}$ by each component of $R_{bb}$, to derive a final boresighted corrected data matrix; wherein this process is denoted as Covariance Matrix Boresighting.

11. The system of signal calibration of claim 9 where the boresight signal is spectrally above or below far field signal, wherein, the far field and boresight signals are as spectrally close as possible with no signal overlap of energy between the two signals; wherein downconversion of the signals to baseband, and digitized by an Analog to Digital Converter, each separate signal, the far field signal and the boresight signal, are digitally filtered, wherein when the far field signal is lower in frequency than the boresight signal, the desired far field signal is subsequently digitally low pass filtered, with a filter cut-off frequency in a spectral gap between the two signals, and the boresight signal is then high pass filtered, with a similar cut-off frequency; wherein the filter for both signals can also be a digital band pass filter; wherein, conversely, the boresight signal is spectrally placed at a frequency below the far field signal, and the boresight signal is low passed filtered with a spectrally higher far field signal high pass filtered, with a filter cut-off frequency in the spectral gap between the two signals; wherein, alternatively, both signals can be band pass filtered.

12. The system of signal calibration of claim 9 for dual or diverse signal polarization calibration, wherein for this method, three digital downconverters are used for each antenna channel, to enable simultaneously collection of two far field signals; wherein each with has signal polarization orthogonal to one another; wherein the same boresight signal is used to calibration calibrate boresight for both far field orthogonally polarized calibration signals; wherein a multiplicity of independent far field signals all within a given band, with a fixed signal polarization, are simultaneously transmitted from the far field at a specified stationary location; wherein this multiplicity of radiated far field signals generated by far field source #1, are emitted by far field source #1 and far field antenna #1 at a given polarization, denoted as polarization #1; wherein these far field signals from source #1 could be any signal modulation, but are usually tone signals; wherein when simultaneously transmitted, time synchronized and stepped incrementally, are become a second set of far field calibration signals, wherein a multiplicity of independent far field signals all within a given band similar to that of source #1, with a fixed signal polarization, are simultaneously transmitted from the far field at a specified stationary location; wherein this multiplicity of radiated signals generated by far field source #2, are emitted by far field source #2 and far field antenna #2 at a given polarization, are denoted as polarization #2; wherein the polarization of far field source antenna #1 is orthogonal to the polarization of far field source antenna #2, wherein the locations and proximity of far field source antenna #1 and far field source antenna #2 are sufficiently separated to product negligible mutual coupling between the two source antennas and therefore the two different composite radiated signal groups, wherein these far field signals from source #1 could be any signal modulation, but are usually tone signals; wherein boresight signals, generated within the system, are spectrally placed at frequency locations between these far field signals; wherein it would be obvious to one skilled in the art, that there are numerous different system architectures and spatial positions for the signals that could implement this solution of system.

13. The system of signal calibration of claim 9 where comb generation calibration boresighting is used to calibration over a wide band of signal operation, and to produce two independent far field polarized signals; wherein a collection of boresight signal tones is simultaneously output from the boresight signal source and split to each independent signal channel, being combined with the far field signal through a signal combiner, and subsequently continuously feed to each receiver channel; wherein a multiplicity of independent far field signals all within a given band, with a fixed signal polarization, are simultaneously transmitted from the far field at a specified stationary location; wherein this multiplicity of radiated signals generated by far field source #1, are emitted by far field source #1 and far field antenna #1 at a given polarization, denoted as polarization #1; wherein these far field signals from source #1 could be any signal modulation, but are usually tone signals; wherein simultaneously transmitted, time synchronized and stepped incrementally, are a second set of far field calibration signals; wherein a multiplicity of independent far field signals all within a given band similar to that of source #1, with a fixed signal polarization, are simultaneously transmitted from the far field at a specified stationary location; wherein this multiplicity of radiated signals generated by far field source #2, are emitted by far field source #2 and far field antenna #2 at a given polarization, denoted as polarization #2; wherein the polarization of far field source antenna #1 is orthogonal to the polarization of far field source antenna #2, wherein the locations and proximity of far field source antenna #1 and far field source antenna #2 are sufficiently separated to product negligible mutual coupling between the two antennas and therefore the two different composite radiated signal groups, wherein these far field signals from source #1 could be any signal modulation, but are usually tone signals; wherein boresight signals, generated within the system, are spectrally placed at frequency locations between these far field signals; wherein it would be obvious to one skilled in the art, that there are numerous different system architectures and spatial positions for the signals that could implement this solution of system.

14. The system of signal calibration of claim 9 where for calibration of continuous time wideband signals, where a total continuous or pulse signal bandwidth exceeds 1% of the carrier frequency; wherein a multiplicity of boresight signals, generated within the system as specified in claim 11, are spectrally located along equal or even non-equal spacings in frequency, all along the spectral width of the far field wideband signal.

15. The system of signal calibration of claim 9 where for calibration of continuous time wideband signals that a multiplicity of narrowband tones are copied, similar for each antenna channel, and injected into and through an RF combiner, for each independent channel, to provide a multiplicity of evenly spaced or non-evenly spaced tones, which are summed with the far field signal, through the RF coupler; wherein after digitization of each antenna channel, narrowband boresight signals are removed via comb band pass filters and a resultant composite signal of boresight signals is digitally frequency channelized, into sub bands, using an appropriate digital frequency channelizer, such as a Fast Fourier Transform, to separate out each individual tone boresight signal; wherein each boresight signal at a given spectral location sub band is processed to form a boresight covariance matrix, as specified in claim 10; wherein the wideband signal is extracted by employing comb notch filters at the locations of boresight tones, to remove the boresight tones, with this composite signal then frequency channelized using a similar channelizer to the boresight signals, and at the same spectral locations as the boresight signals; wherein the frequency channelized band signal streams of the original wideband signals are used for far field frequency channelized covariance matrices, as specified in claim 10; wherein for each frequency channelized sub band, the frequency channelized boresight covariance matrices are divided by the same frequency channelized far field covariance matrices, on a matrix element basis, to generate a multiplicity of resultant boresight calibrated frequency channelized covariance matrices, each of dimension M×M.

16. The system of signal calibration of claim 9 wherein pulse signal calibration is performed using the Covariance Boresighting technique of claim 10; wherein the far field pulse signal is collected during a short RF dwell equal to the pulse length; wherein the boresight signals are collected when the far field pulse signal is off; wherein the sample data vectors for the far field pulse signal are then outer product multiplied to produce a far field covariance matrix and then when off, a boresight signal is injected through the RF combiners to produce sample data vectors for boresighting, which are then outer product multiplied to produce a boresight covariance matrix; wherein the two matrices are divided by one another, on a matrix element basis, to produce a final M×M calibrated covariance matrix.

* * * * *